United States Patent
Honda et al.

(10) Patent No.: US 10,113,888 B2
(45) Date of Patent: Oct. 30, 2018

(54) POSITION DETECTION APPARATUS, APPARATUS INCLUDING THE SAME AND POSITION DETECTION METHOD

(71) Applicant: CANON KABUSHIKI KAISHA, Tokyo (JP)

(72) Inventors: Hirofumi Honda, Machida (JP); Daisuke Ishikawa, Yokohama (JP); Toshihiko Tomosada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 299 days.

(21) Appl. No.: 15/056,740

(22) Filed: Feb. 29, 2016

(65) Prior Publication Data

US 2016/0258787 A1 Sep. 8, 2016

(30) Foreign Application Priority Data

Mar. 3, 2015 (JP) .................................. 2015-040938
Mar. 3, 2015 (JP) .................................. 2015-041004
(Continued)

(51) Int. Cl.
*G01D 5/34* (2006.01)
*G01D 5/347* (2006.01)
(Continued)

(52) U.S. Cl.
CPC ......... *G01D 5/34776* (2013.01); *G01D 5/165* (2013.01); *G01D 5/24476* (2013.01)

(58) Field of Classification Search
CPC ............... G01D 5/54; G01D 5/56; G01D 5/58
See application file for complete search history.

(56) References Cited

U.S. PATENT DOCUMENTS 4,988,945 A * 1/1991 Nagase .................. G01D 5/145
  250/231.13
2003/0177649 A1* 9/2003 Ito ........................ G01D 5/2492
  33/1 PT
(Continued)

FOREIGN PATENT DOCUMENTS

CN 103323039 A 9/2013
CN 103604448 A 2/2014
(Continued)

OTHER PUBLICATIONS

Apr. 18, 2018 Chinese Office Action, which is enclosed with an English Translation, that issued in Chinese Patent Application No. 201610122228.7.

*Primary Examiner* — Thanh Luu

(74) *Attorney, Agent, or Firm* — Cowan, Liebowitz & Latman, P.C.

(57) ABSTRACT

The position detection apparatus includes the first optical position detector used with an optical scale having periodic patterns. The first position detector receives lights from the periodic patterns when moving relatively to the optical scale with a movement of a movable member to generate first detection signals respectively changing at periods corresponding to periods of the periodic patterns. The second non-optical position detector generates a second detection signal changing with the movement of the movable member. The calculator produces a first position signal by using the first detection signals, produces a second position signal whose resolution is different from that of the first position signal, by using the second detection signal, and performs a calculation for combining the first and second position signals together to produce an absolute position signal.

18 Claims, 25 Drawing Sheets

(30) Foreign Application Priority Data

| | | |
|---|---|---|
| Mar. 3, 2015 | (JP) | 2015-041075 |
| Mar. 3, 2015 | (JP) | 2015-041111 |
| Mar. 31, 2015 | (JP) | 2015-071789 |

(51) Int. Cl.
  *G01D 5/165* (2006.01)
  *G01D 5/244* (2006.01)

(56) References Cited

U.S. PATENT DOCUMENTS

2006/0266574 A1* 11/2006 Lundmark ............ B60G 7/008
  180/432
2009/0033946 A1* 2/2009 Kon ..................... G01D 5/56
  356/499
2013/0292558 A1 11/2013 Horiguchi

FOREIGN PATENT DOCUMENTS

| CN | 103983291 A | 8/2014 |
|---|---|---|
| JP | 06-205259 A | 7/1994 |
| JP | 2013-234861 A | 11/2013 |

\* cited by examiner

POSITION DETECTION APPARATUS, APPARATUS INCLUDING THE SAME AND POSITION DETECTION METHOD

BACKGROUND OF THE INVENTION

The present invention relates to a position detection apparatus that detects an absolute position of a movable member, and particularly to an optical position detection apparatus using an optical scale.

Optical position detection apparatuses are each constituted by a light-receiving sensor fixed to one of a movable member and a base member and an optical scale fixed to the other of the movable member and the base member. The optical scale is provided with a periodic pattern reflecting or transmitting light. Detecting the light from the periodic pattern by the light-receiving sensor with a movement of the movable member provides a detection signal changing at a period depending on a period of the periodic pattern.

Such optical position detectors (hereinafter referred to as "optical encoders") include one having an optical scale provided with two (paired) periodic patterns whose phases are mutually different and detecting lights from the two periodic patterns by a light-receiving sensor to provide two periodic signals (paired two-phase signals) whose phases are mutually different. A calculation using the two-phase signals provides a relative position of the movable member relative to the base member.

Furthermore, the optical encoders include, as disclosed in Japanese Patent Laid-Open No. 2013-234861, another one using an optical scale provided with multiple paired periodic patterns each pair of which includes periodic patterns having a long period and a short period; the long periods and the short periods of the respective paired periodic patterns are mutually slightly different. This optical encoder detects lights from the multiple paired periodic patterns by a light-receiving sensor to generate multiple paired two-phase signals and performs calculations on the multiple paired two-phase signals to produce multiple position signals whose periods are mutually different (for example, an upper level signal having a long period and a lower level signal having a short period). Then, combining these multiple position signals enables calculating an absolute position of a movable member.

However, the above optical encoders have a problem that an unclean optical scale having a smudge (including a scratch) or dust thereon causes a noise in the detection signal, which disables an accurate position detection of the movable member, that is, causes erroneous position detection. In particular, in the optical encoder disclosed in Japanese Patent Laid-Open No. 2013-234861, a multiplying process performed on the upper level signal for combining the upper and lower level signals also amplifies the noise. Thus, the unclean optical scale significantly affects the position detection.

Furthermore, the above optical encoders have another problem that an expansion and a contraction of the optical scale due to a temperature change changes a relative positional relation between the movable member and the optical scale, which disables an accurate position detection of the movable member, that is, causes erroneous position detection. In particular, the optical encoder disclosed in Japanese Patent Laid-Open No. 2013-234861 performs the multiplying process performed on the upper level signal for combining the upper and lower level signals, so that a variation of the upper level signal due to the expansion and contraction of the optical scale significantly affects the position detection.

Moreover, in a rear-focus zoom lens in which its focus lens is disposed on an image plane side further than its magnification-varying lens, a movement of the magnification-varying lens causes an image plane movement. Thus, a control causing the focus lens to move with the movement of the magnification-varying lens so as to reduce the image plane movement, that is, a zoom tracking control is performed to maintain an in-focus state. An optical apparatus disclosed in Japanese Patent Laid-Open No. 06-205259 holds cam data indicating positions of the focus lens at which an in-focus state is maintained for respective positions of the magnification-varying lens and performs, by using the cam data, the zoom tracking control to move the focus lens with the movement of the magnification-varying lens.

This zoom tracking control is also performed when a manual zoom operation is performed for moving the magnification-varying lens through a user's rotation operation of a zoom operation ring. The manual zoom operation uses a magnification-varying mechanism that transmits the rotation of the zoom operation ring to a cam ring to rotate it about an optical axis and moves the magnification-varying lens in an optical axis direction by a cam formed in the cam ring. With the movement of the magnification-varying lens, the zoom tracking control detects rotation direction and position of the zoom operation ring, which correspond to a position of the magnification-varying lens, by a position detection apparatus such an encoder and moves the focus lens to a position in the cam data corresponding to the detected rotation direction and position.

Such a magnification-varying mechanism has an engagement portion in which the zoom operation ring and the cam ring engage with each other in order to transmit the rotation of the zoom operation ring to the cam ring, and the engagement portion has backlash. This backlash retards the rotation of the cam ring and thereby the magnification-varying is not moved until the backlash is reduced (eliminated). Furthermore, this retardation of the rotation of the cam ring until the backlash is reduced is generated when the zoom operation ring is rotated in both a telephoto direction and a wide-angle direction, so that two rotation positions of the zoom operation ring in each of a telephoto area and a wide-angle area are detected as the same rotation position. Accordingly, it is necessary to provide separate cam data for each rotation direction of the zoom operation ring, that is, for each magnification variation direction and to select the cam date used for the zoom tracking control, depending on the rotation direction of the zoom operation ring detected by using the position detection apparatus.

However, though the manual zoom performed by the user's rotation operation of the zoom operation ring can move the magnification-varying lens even in a non-energized state (power-off state) where the position detection apparatus is not energized, the rotation direction of the zoom operation ring cannot be detected. An unknown rotation direction of the zoom operation ring in the non-energized state makes the direction (telephoto or wide-angle direction) in which the backlash is reduced unclear at start of energization (power-on), which makes unclear which one of the cam data provided for the respective magnification variation directions should be selected immediately after the power-on. In addition, the unknown rotation direction of the zoom operation ring in the non-energized state makes unclear whether to immediately move the focus lens, in response to the rotation of the zoom operation ring after the power-on, according to the cam data provided for the rotation direction of the zoom operation ring (that is, the magnification variation direction) or to stop moving the focus lens until the backlash is reduced. This makes it impossible to perform a good zoom tracking control.

BRIEF SUMMARY OF THE INVENTION

The present invention provides a position detection apparatus capable of reducing an influence of an unclean optical scale having a smudge or dust thereon. The present invention also provides a position detection apparatus capable of performing an accurate position detection regardless of an expansion and a contraction of an optical scale due to a temperature change. The present invention further provides a focus control apparatus and an optical apparatus including the same which are capable of performing, when a manual zoom is performed, a good zoom tracking control from immediately after power-on.

The present invention provides as an aspect thereof a position detection apparatus including a first position detector being an optical position detector used with an optical scale provided with multiple periodic patterns whose periods are mutually different and configured to receive lights from the multiple periodic patterns when moving relatively to the optical scale with a movement of a movable member to generate multiple first detection signals respectively changing at periods corresponding to the periods of the multiple periodic patterns, a second position detector being a non-optical position detector and configured to generate a second detection signal changing with the movement of the movable member, and a calculator configured to produce a first position signal by using the multiple first detection signals, produce a second position signal whose resolution is different from that of the first position signal, by using the second detection signal, and perform a calculation for combining the first position signal with the second position signal to produce a signal showing an absolute position of the movable member.

The present invention provides as another aspect thereof an apparatus including the above position detection apparatus, and a movable member whose absolute position is detected by the position detection apparatus.

The present invention provides as still another aspect thereof a position detection method using a first position detector being an optical position detector used with an optical scale provided with multiple periodic patterns whose periods are mutually different and configured to receive lights from the multiple periodic patterns when moving relatively to the optical scale with a movement of a movable member to generate multiple first detection signals respectively changing at periods corresponding to the periods of the multiple periodic patterns, and a second position detector being a non-optical position detector and configured to generate a second detection signal changing with the movement of the movable member. The method includes producing a first position signal by using the multiple first detection signals, producing a second position signal whose resolution is different from that of the first position signal, by using the second detection signal, and performing a calculation for combining the first position signal with the second position signal to produce a signal showing an absolute position of the movable member.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1:
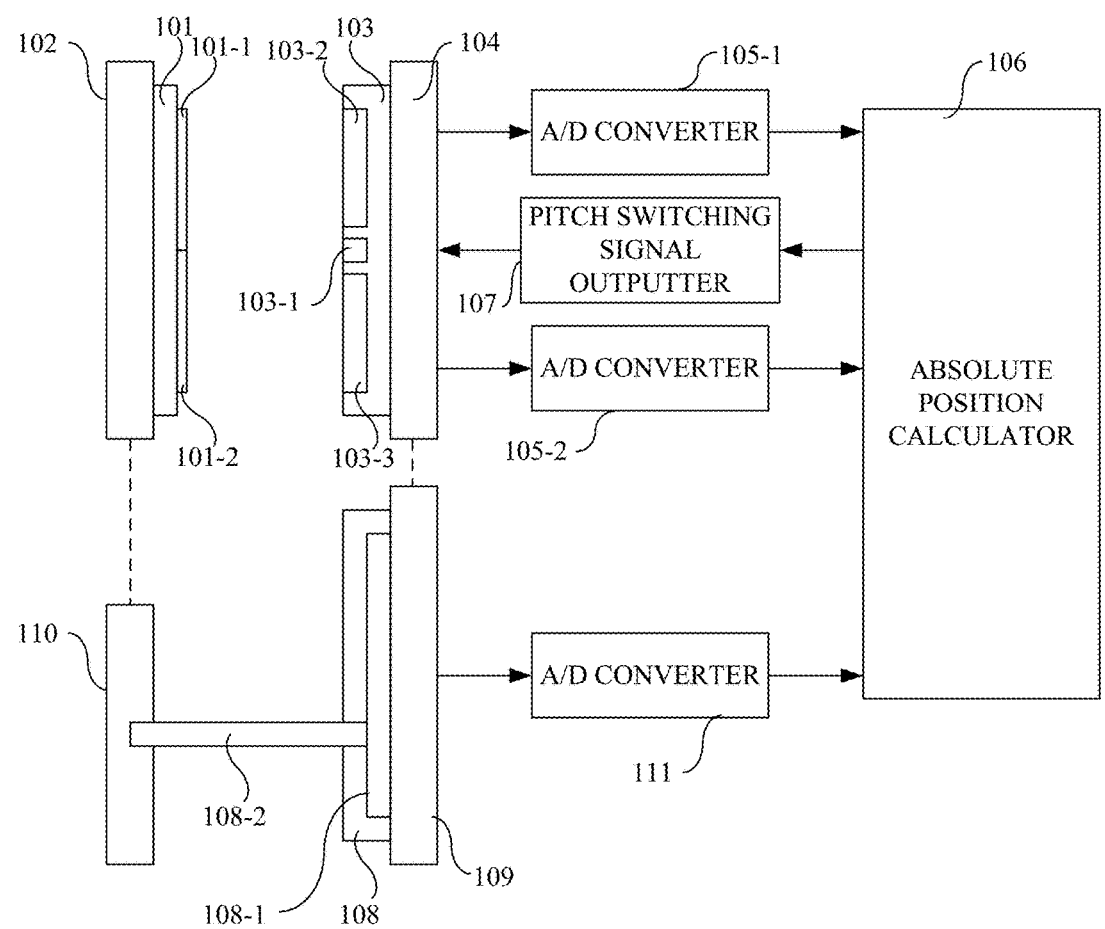
FIG. 1 is a block diagram illustrating a configuration of an encoder that is Embodiment 1 of the present invention.
Figure 2A:
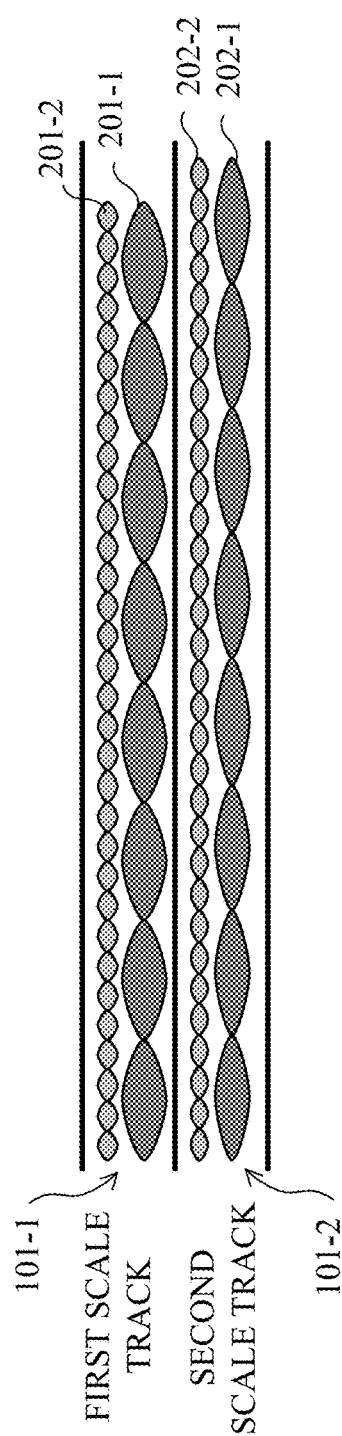
FIGS. 2A, 2B and 2C illustrate a method of detecting track patterns in Embodiment 1.

FIG. 1 illustrates a configuration of an encoder as a position detection apparatus that is a first embodiment (Embodiment 1) of the present invention. Reference numeral 101 denotes an optical scale fixed to a movable member 102 that is movable with respect to a base member 104. The optical scale 101 is provided with a first scale track 101-1 and a second scale track 101-2, which are also illustrated in FIG. 2A.

Reference numeral 103 denotes an optical sensor unit (hereinafter simply referred to as "an optical sensor") fixed to the base member 104. The optical sensor 103 is provided with a light emitter 103-1 including an LED as a light source, a first light receiver 103-2 and a second light receiver 103-3. The first and second light receivers 103-2 and 103-3 each include multiple light-receiving elements arranged in a direction in which the optical scale 101 is movable, that is, in a relative movement direction of the optical scale 101 and the optical sensor 103; the relative movement direction is hereinafter referred to as "a position detection direction".

In this embodiment, the optical scale 101 is fixed to the movable member 102, and the optical sensor 103 is fixed to the base member 104. However, the optical scale 101 may be fixed to the base member 104, and the optical sensor 103 is fixed to the movable member 102. That is, it is only necessary that the optical scale 101 and the optical sensor 103 be relatively movable with respect to each other by the movement of the movable member 102 with respect to the base member 104.

The optical sensor 103 is disposed so as to face the optical scale 101. Light as a divergent light flux emitted from the light emitter 103-1 in the optical sensor 103 is projected to the first scale track 101-1 and the second scale track 101-2 on the optical scale 101. Light reflected by multiple periodic patterns (two periodic patterns 201-1 and 201-2 illustrated in FIG. 2A) provided in the first scale track 101-1 proceeds toward the first light receiver 103-2 to form thereon two optical images (hereinafter referred to also as "pattern images") of the periodic patterns 201-1 and 201-2 in the first scale track 101-1.

On the other hand, light reflected by multiple periodic patterns (two periodic patterns 202-1 and 202-2 illustrated in FIG. 2A) provided in the second scale track 101-2 proceeds toward the second light receiver 103-3 to form thereon two optical images (pattern images) of the periodic patterns 202-1 and 202-2 in the second scale track 101-2. Each periodic pattern is constituted by reflective portions each reflecting light and non-reflective portions each not reflecting light; the reflective and non-reflective portions are alternately arranged in the position detection direction.

The first light receiver 103-2 photoelectrically converts the two received pattern images (that is, reads the periodic patterns 201-1 and 201-2) to output two detection signals corresponding to the two pattern images. Similarly, the second light receiver 103-3 photoelectrically converts the two received pattern images (that is, reads the periodic patterns 202-1 and 202-2) to output two detection signals corresponding to the two pattern images. When the optical scale 101 is moved with the movable member 102 with respect to the optical sensor 103, each detection signal becomes a signal (hereinafter referred to as "a periodic signal") changing at a period corresponding to a period of the corresponding periodic pattern.

Each of the periodic signals output from the first light receiver 103-2 is converted into a digital signal by an A/D converter 105-1, and the digital signal is input to an absolute position calculator 106. Each of the periodic signals output from the second light receiver 103-3 is converted into a digital signal by an A/D converter 105-2, and the digital signal is input to the absolute position calculator 106.

The absolute position calculator 106 as a calculator calculates, by using the digital signals input from the A/D converters 105-1 and 105-2, an absolute position of the movable member 102.

A pitch switching signal outputter 107 outputs, to the optical sensor 103, a pitch switching signal for switching a light-receiving pitch (detection pitch) of the multiple light-receiving elements provided to each of the first and second light receivers 103-2 and 103-3. The optical sensor 103 switches, in response to input of the pitch switching signal, the light-receiving pitch between a first light-receiving pitch corresponding to pitches of the periodic patterns 201-1 and 202-1 each having a long period and a second light-receiving pitch corresponding to pitches of the periodic patterns 201-2 and 202-2 each having a short period. The switching of the light-receiving pitch enables each of the first and second light-receivers 103-2 and 103-3 to read the two periodic patterns.

A more detailed description will be made of the periodic patterns 201-1, 201-2, 202-1 and 202-2 of the first and second scale tracks 101-1 and 101-2 illustrated in FIG. 2A. FIG. 2A illustrates simplified periodic patterns of each scale track. In reality, each scale track includes, in a direction (hereinafter referred to as "a scale width direction") orthogonal to the position detection direction in the optical scale 101, a greater number of periodic patterns than the two periodic patterns illustrated in FIG. 2A.

The two periodic patterns 201-1 and 201-2 provided to the first scale track 101-1 respectively have periods P1 and P2 different from each other. The period P1 is longer than the period P2. In the following description, the periodic pattern 201-1 is referred to also as "a long periodic pattern", and the periodic pattern 201-2 is referred to also as "a short periodic pattern". In the optical scale 101, in reality, the long periodic patterns 201-1 and the short periodic patterns 201-2 are arranged alternately in the scale width direction.

on the other hand, the two periodic patterns 202-1 and 202-2 provided to the second scale track 101-2 respectively have periods P1' and P2' different from each other. The period P1' is longer than the period P2'. In the following description, the periodic pattern 202-1 is referred to also as "a long periodic pattern", and the periodic pattern 202-2 is referred to also as "a short periodic pattern". In the optical scale 101, in reality, the long periodic patterns 202-1 and the short periodic patterns 202-2 are arranged alternately in the scale width direction.

The period P1 of the long periodic pattern 201-1 and the period P1' of the long periodic pattern 202-1 are slightly different from each other (P1<P1'). The period P2 of the short periodic pattern 201-2 and the period P2' of the short periodic pattern 202-2 are slightly different from each other (P2<P2').

Figure 2B:
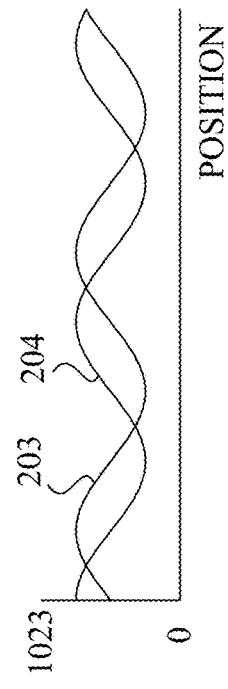

FIG. 2B illustrates the two periodic signals output from the first and second light receivers 103-2 and 103-3 of the optical sensor 103 reading the long periodic patterns 201-1 and 202-1 or the short periodic patterns 201-2 and 202-2. A vertical axis represents values (10-bit A/D converted values) of the periodic signal from each light receiver. A horizontal axis represents positions of the optical scale 101 (movable member 102) with respect to the optical sensor 103.

The first and second light receivers 103-2 and 103-3 output, with the movement of the movable member 102, two phase periodic signals (hereinafter referred to as "two phase signals") 203 and 204 having mutually different phases. These two phase signals 203 and 204 correspond to a sine wave and a cosine wave whose phases are mutually different by 90°.

Figure 2C:
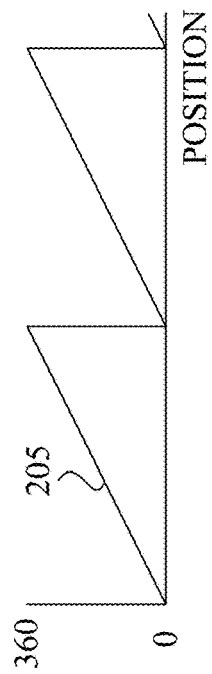

FIG. 2C illustrates a result of an arctangent conversion of the two phase signals 203 and 204 as the sine and cosine waves into a signal 205 changing in a range from 0 to $2\pi$. A vertical axis represents angles (in radian) from 0 to $2\pi$. A horizontal axis represents the positions of the optical scale 101 with respect to the optical sensor 103.

The above-described configuration of the encoder of this embodiment is identical to that of conventional optical encoders. Next, description will be made of an absolute position calculation process performed in the conventional optical encoders and problems occurring therefrom.

Figure 3:
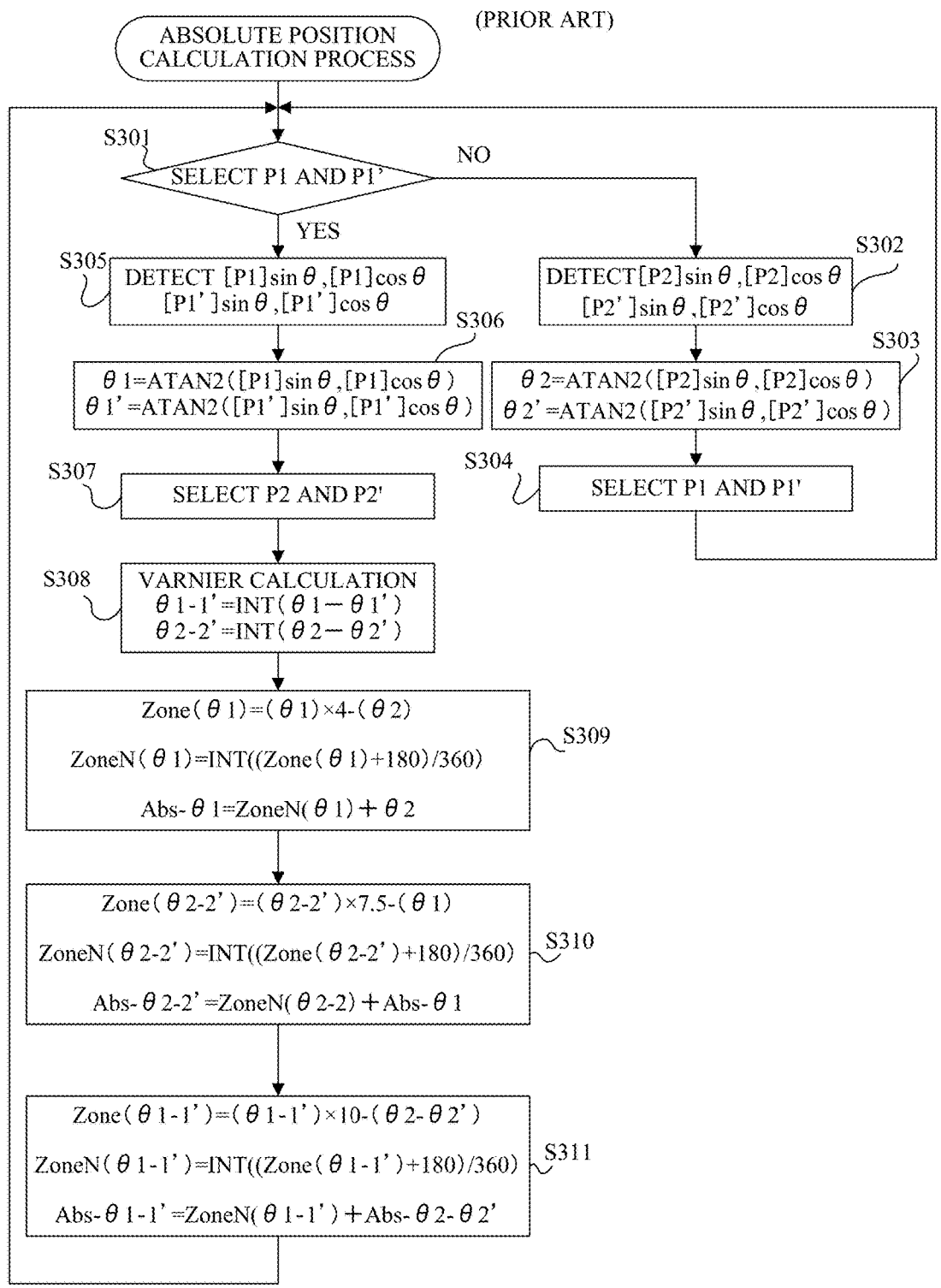
FIG. 3 illustrates a flowchart of a conventional absolute position calculation process.

FIG. 3 illustrates a flowchart of the absolute position calculation process performed by an absolute position calculator 106 in the conventional optical encoder. In the following description, as an example, the optical scale 101 has a length (scale length) of 40 mm in the position detection direction, and pattern numbers (numbers of the reflective portions) of the periodic patterns 201-1, 201-2, 202-1 and 202-2 on the optical scale 101 are respectively 75, 300, 74 and 290. The periodic signals corresponding to the periodic patterns 201-1, 201-2, 202-1 and 202-2 are hereinafter referred to respectively as "P1", "P2", "P1'" and "P2'".

The absolute position calculator 106 having detected at step S301 that the light-receiving pitch corresponding to P2 and P2' is selected by the pitch switching signal outputter 107 proceeds to step S302. At step S302, the absolute position calculator 106 detects signals sampled by the A/D converters 105-1 and 105-2 as P2 and P2'.

Next, at step S303, the absolute position calculator 106 performs an arctangent conversion process on P2 and P2' to produce signals θ2 and θ2'. When sine waves and cosine waves of P2 and P2' are expressed as:

[P2] sin θ and [P2] cos θ; and

[P2'] sin θ and [P2'] cos θ, the signals θ2 and θ2' as results of the arctangent conversion process on P2 and P2' are expressed by following expressions (1) and (2).

$$\theta 2 = A\ \text{TAN}\ 2([P2]\sin\theta, [P2]\cos\theta) \quad (1)$$

$$\theta 2' = A\ \text{TAN}\ 2([P2']\sin\theta, [P2']\cos\theta) \quad (2)$$

After this arctangent conversion process, at step S304, the absolute position calculator 106 outputs a command for selection of the light-receiving pitch corresponding to P1 and P1' to the pitch switching signal outputter 107. Then, the absolute position calculator 106 returns to step S301.

The absolute position calculator 106 having detected at step S301 that the light-receiving pitch corresponding to P1 and P1' is selected by the pitch switching signal outputter 107 proceeds to step S305. At step S305, the absolute position calculator 106 detects signals sampled by the A/D converters 105-1 and 105-2 as P1 and P1'.

Next, at step S306, the absolute position calculator 106 performs the arctangent conversion process on P1 and P1' to produce signals θ1 and θ1'. When sine waves and cosine waves of P1 and P1' are expressed as:

[P1] sin θ and [P1] cos θ; and

[P1'] sin θ and [P1'] cos θ, the signals θ1 and θ1' as results of the arctangent conversion process on P1 and P1' are expressed by following expressions (3) and (4).

$$\theta 1 = A\ \text{TAN}\ 2([P1]\sin\theta, [P1]\cos\theta) \quad (3)$$

$$\theta 1' = A\ \text{TAN}\ 2([P1']\sin\theta, [P1']\cos\theta) \quad (4)$$

After this arctangent conversion process, at step S307, the absolute position calculator 106 outputs a command for selection of the light-receiving pitch corresponding to P2 and P2' to the pitch switching signal outputter 107. Then, the absolute position calculator 106 proceeds to step S308.

At step S308, the absolute position calculator 106 performs a vernier calculation process (hereinafter referred to simply as "a vernier calculation") on the signals θ1 and θ1' to produce an upper level signal used for calculating an absolute position. Furthermore, the absolute position calculator 106 performs another vernier calculation on the signals θ2 and θ2' to produce a middle level signal used for calculating the absolute position. Thereafter, the absolute position calculator 106 proceeds to step S309.

Figure 4:
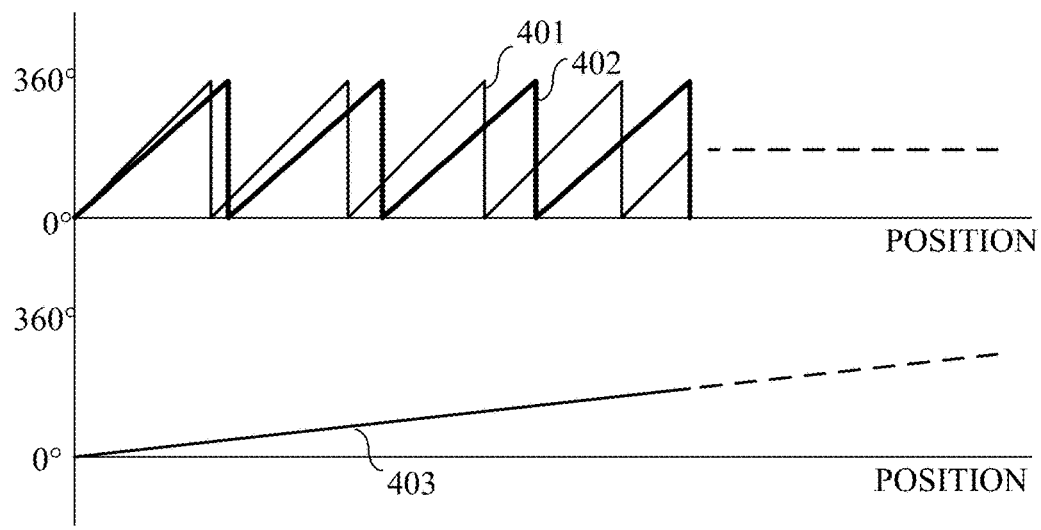
FIG. 4 illustrates a vernier calculation.

FIG. 4 illustrates the vernier calculation on the signals θ1 and θ1'. Reference numerals 401 and 402 denotes the signals θ1 and θ1'. A vernier signal θ1-1' as the upper level signal produced by the vernier calculation on the signals θ1 and θ1' is calculated by following expression (5).

$$\theta 1\text{-}1' = INT(\theta 1\text{-}\theta 1') \quad (5)$$

Reference numeral 403 in FIG. 4 denotes the vernier signal θ1-1'.

Similarly, a vernier signal θ2-2' as the middle level signal produced by the vernier calculation on the signals θ2 and θ2' is calculated by following expression (6).

$$\theta 2\text{-}2' = INT(\theta 2\text{-}\theta 2') \quad (6)$$

The vernier signal has a folding-back point in a range from 0 to $2\pi$ at a phase where folding-back points of the two signals on which the vernier calculation is performed coincide with each other, that is, at a point corresponding to a least common multiple between the pattern numbers of the periodic patterns corresponding to the two signals. Thus, in the range from 0 to $2\pi$, the vernier signal θ1-1' has one folding-back point, and the vernier signal θ2-2' has 10 folding-back points.

The folding-back point of the vernier signal θ1-1' is the following point in the periodic patterns 201-1 and 202-1 corresponding to P1 and P1'.

(P1:P1')=(75,74)

The folding-back points of the vernier signal θ2-2' are the following points in the periodic patterns 202-1 and 202-2 corresponding to P2 and P2'.

(P2:P2')=(30,29),(60,58),(90,87),(120,116),(150,145),
(180,174),(210,203),(240,232),(270,261),(300, 290)

The absolute position calculator 106 calculates, by the above-described processes from steps S301 to S308, four kinds of signals for calculating the absolute position, that is, the upper level signal θ1-1', the middle level signal θ2-2', the signal θ1 as a lower level signal and the signal θ2 as a lowest level signal. The middle level signal θ2-2', the lower level signal θ1 and the lowest level signal θ2 correspond to a first position signal.

Figure 5:
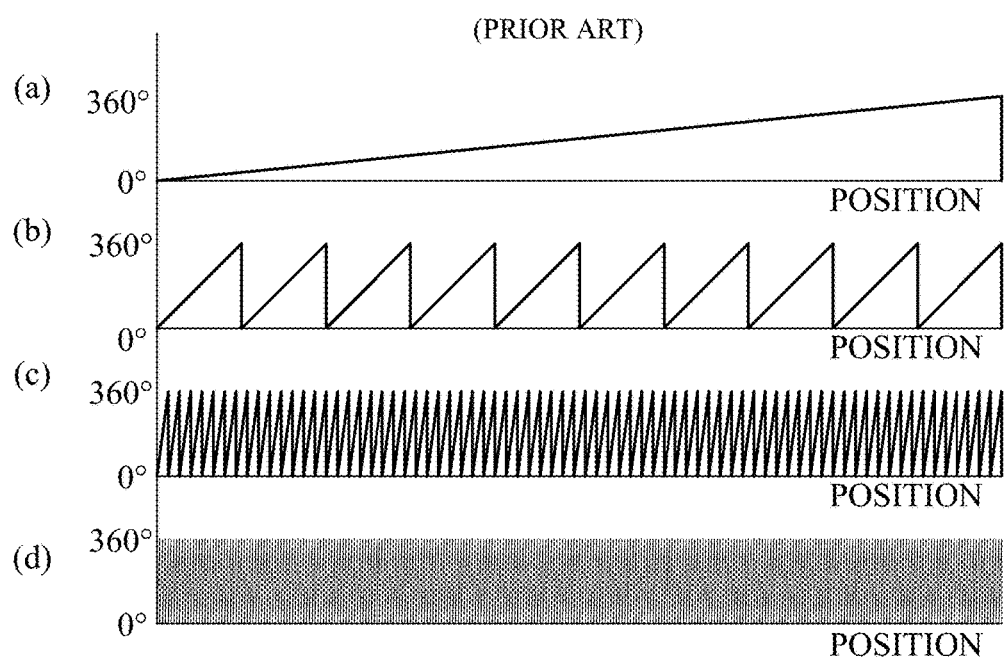
FIG. 5 illustrates an upper level signal, a middle level signal and a lower level signal in the conventional absolute position calculation process.

FIG. 5 illustrates the absolute position calculated by the above-described absolute position calculation process. In FIG. 5, part (a) illustrates the upper level signal corresponding to the vernier signal θ1-1' having only one folding-back point (in other words, including one folded-back portion as a signal component) on the optical scale 101. Part (b) illustrates the middle level signal corresponding to the vernier signal θ2-2'. This middle level signal includes 10 folded-back portions (folded-back signal components) on the optical scale 101. A value of the upper level signal indicates what number folded-back portion of the middle level signal a current position is in. That is, the upper level signal enables specifying one folded-back portion among the 10 folded-back portions.

Furthermore, in FIG. 5, part (c) illustrates the lower level signal corresponding to the signal θ1 including 75 folded-back portions on the optical scale 101. A value of the middle level signal indicates what number folded-back portion of the lower level signal a current position is in. Part (d) illustrates the lowest level signal corresponding to the signal θ2. This lowest level signal includes 300 folded-back portions on the optical scale 101. A value of the lower level signal indicates what number folded-back portion of the lowest level signal a current position is in. Accordingly, combining together the upper, middle, lower and lowest level signals enables acquiring the absolute position.

Next, description will be made of combining processes performed on the upper, middle, lower and lowest level signals. First, description will be made of a combining process performed on the upper and middle level signals with referring to FIG. 6.

Figure 6:
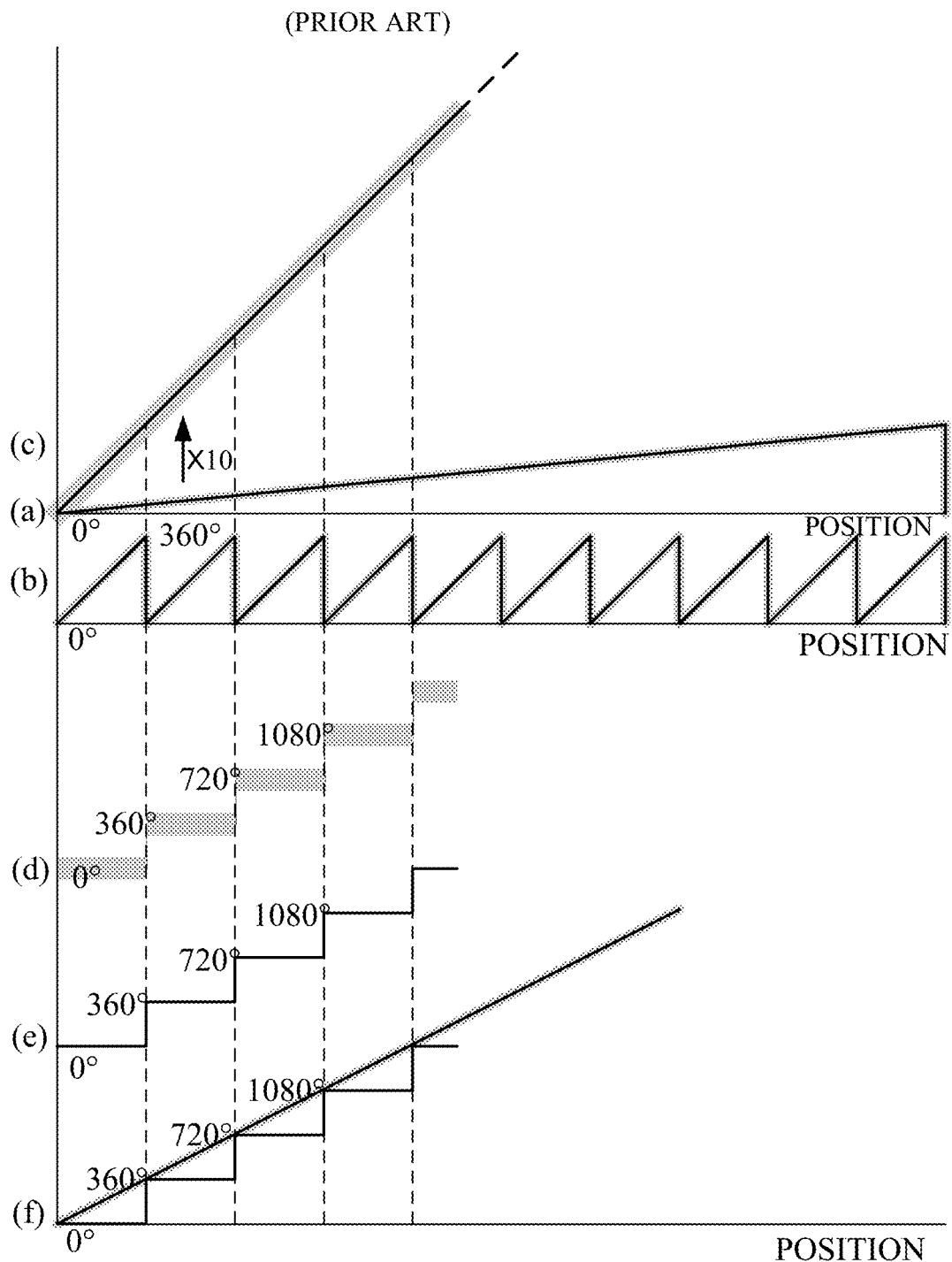
FIG. 6 illustrates a combining process of the upper and middle level signals in the conventional absolute position calculation process.

In FIG. 6, (a) denotes the upper level signal θ1-1', and (b) denotes the middle level signal θ2-2'. In order to combine the upper level signal with the middle level signal, the combining process first produces a zone signal. The zone signal is produced in order to specify what number folded-back portion of the middle level signal a current position is in. As described above, the upper level signal has one folding-back point on the optical scale 101 and the middle level signal has 10 folding-back points thereon, so that multiplying the upper level signal by 10 as an integer provides a signal having a slope identical to that of the middle level signal.

A difference between the signal obtained by multiplying the upper level signal by 10 and the middle level signal provides the zone signal denoted by (d). However, the zone signal includes a noise, and therefore a discretizing process is performed on the zone signal to remove the noise. In FIG. 6, (e) denotes a zone signal after the discretizing process.

Finally, adding the milled level signal to the discretized zone signal provides a combined signal, as denoted by (f), in which these signals are combined with each other. The combined signal has the same resolution as that of the middle level signal and the same scale range as that of the upper level signal.

At step S309, the absolute position calculator 106 combines the lowest level signal with the lower level signal by a combing process similar to that described using FIG. 6. Next, at step S310, the absolute position calculator 106 combines the lower level signal with the middle level signal in a similar manner. Furthermore, at step S311, the absolute position calculator 106 combines the middle level signal with the upper level signal by the method described using FIG. 6. Thus, the combination of the lowest, lower, middle and upper level signals is completed to produce one absolute position signal.

Next, description of the combining processes performed at steps 309 to S311 will be made by using numerical expressions.

[Combining Process on Lower and Lowest Level Signals at step S309]

The lowest level signal has 300 folding-back points on the optical scale 101, and the lower level signal has 75 folding-back points thereon, so that multiplying the lower level signal by 4 (=300/75) matches a slope of the lower level signal and that of the lowest level signal to each other. The absolute position calculator 106 calculates, as shown by following expression (7), a difference between the signal obtained by multiplying the lower level signal θ1 by 4 and the lowest level signal θ2 to acquire a zone signal Zone(θ1).

$$\text{Zone}(\theta1)=(\theta1)\times 4-(\theta2) \tag{7}$$

Furthermore, the absolute position calculator 106 performs the discretizing process on the zone signal Zone(θ1) by following expression (8) to remove the noise therefrom.

$$\text{ZoneN}(\theta1)=INT((\text{Zone}(\theta)+180)/360) \tag{8}$$

Next, the absolute position calculator 106 adds the lowest level signal θ2 to the discretized zone signal ZoneN(θ1) as shown by following expression (9) to calculate a lower level combined signal Abs-θ1 in which the lower and lowest level signals are combined with each other.

$$\text{Abs-}\theta1=\text{ZoneN}(\theta1)+\theta2 \tag{9}$$

[Combining Process on Middle and Lowest Level Signals at Step S310]

The lower level signal has 75 folding-back points on the optical scale 101, and the middle level signal has 10 folding-back points thereon, so that multiplying the middle level signal by 7.5 (=75/10) matches a slope of the middle level signal and that of the lower level signal to each other. The absolute position calculator 106 calculates, as shown by following expression (10), a difference between the signal obtained by multiplying the middle level signal θ2-2' by 7.5 and the lower level signal θ1 to acquire a zone signal Zone(θ2-2').

$$\text{Zone}(\theta2-2')=(\theta2-2')\times 7.5-(\theta1) \tag{10}$$

Furthermore, the absolute position calculator 106 performs the discretizing process on the zone signal Zone(θ2-2') by following expression (11) to remove the noise therefrom.

$$\text{ZoneN}(\theta2-2')=INT((\text{Zone}(\theta2-2')+180)/360) \tag{11}$$

Next, the absolute position calculator 106 adds the lower level combined signal Abs-θ1 to the discretized zone signal ZoneN(θ2-2') as shown by following expression (12) to calculate a middle level combined signal Abs-(θ2-2') in which the middle and lower level signals are combined with each other.

$$\text{Abs-}(\theta 2\text{-}2')=\text{Zone}N(\theta 2\text{-}2')+(\text{abs-}\theta 1) \quad (12)$$

The lower level combined signal Abs-θ1 is produced by combining the lower and lowest level signals, and therefore the middle level combined signal Abs-(θ2-2') corresponds to a signal obtained by combining together the middle, lower and lowest level signals.

[Combining Process on Upper and Middle Level Signals at Step S311]

The upper level signal has one folding-back point on the optical scale 101, and the middle level signal has 10 folding-back points thereon, so that multiplying the upper level signal by 10 (=10/1) matches a slope of the upper level signal and that of the middle level signal to each other. The absolute position calculator 106 calculates, as shown by following expression (13), a difference between the signal obtained by multiplying the upper level signal θ1-1' by 10 and the middle level signal θ2-θ2' to acquire a zone signal Zone(θ1-1').

$$\text{Zone}(\theta 1\text{-}1')=(\theta 1\text{-}1')\times 10-(\theta 2\text{-}\theta 2') \quad (13)$$

Furthermore, the absolute position calculator 106 performs the discretizing process on the zone signal Zone(θ1-1') by following expression (14) to remove the noise therefrom.

$$\text{Zone}N(\theta 1\text{-}1')=INT((\text{Zone}(\theta 1\text{-}1')+180)/360) \quad (14)$$

Next, the absolute position calculator 106 adds the middle level combined signal Abs-(θ2-2') to the discretized zone signal ZoneN(θ1-1') as shown by following expression (15) to calculate an upper level combined signal Abs-(θ1-1') in which the upper and middle level signals are combined with each other.

$$\text{Abs-}(\theta 1\text{-}1')=\text{Zone}N(\theta\text{-}1')+(\text{Abs-}(\theta 2\text{-}2')) \quad (15)$$

The middle level combined signal Abs-(θ2-2') is produced by combining the middle, lower and lowest level signals, and therefore the upper level combined signal Abs-(θ1-1') corresponds to a signal obtained by combining together all the upper, middle, lower and lowest level signals. Accordingly, the upper level combined signal Abs-(θ1-1') has the same resolution as that of the lowest level signal and the same scale range as that of the upper level signal.

The series of the above-described processes from step S300 to step S311 produces an absolute position signal (upper level combined signal) Abs-(θ1-1') that is the signal showing the absolute position.

Next, description will be made of the problems occurring from the above-described conventional absolute position calculation process. The optical encoder configured as described above acquires a highly accurate absolute position by combining the upper, middle, lower and lowest level signals whose periods (numbers of the folded-back portions) are mutually different and which are produced through reading the multiple periodic patterns on the optical scale 101 by the optical sensor 103. However, a smudge (including a scratch) and dust existing on the optical scale 101 affect accuracy of the absolute position. In particular, the combination of the upper and middle level signals in which a division number of the zone signal is large is significantly affected thereby. The following description includes a cause thereof.

Figure 7:
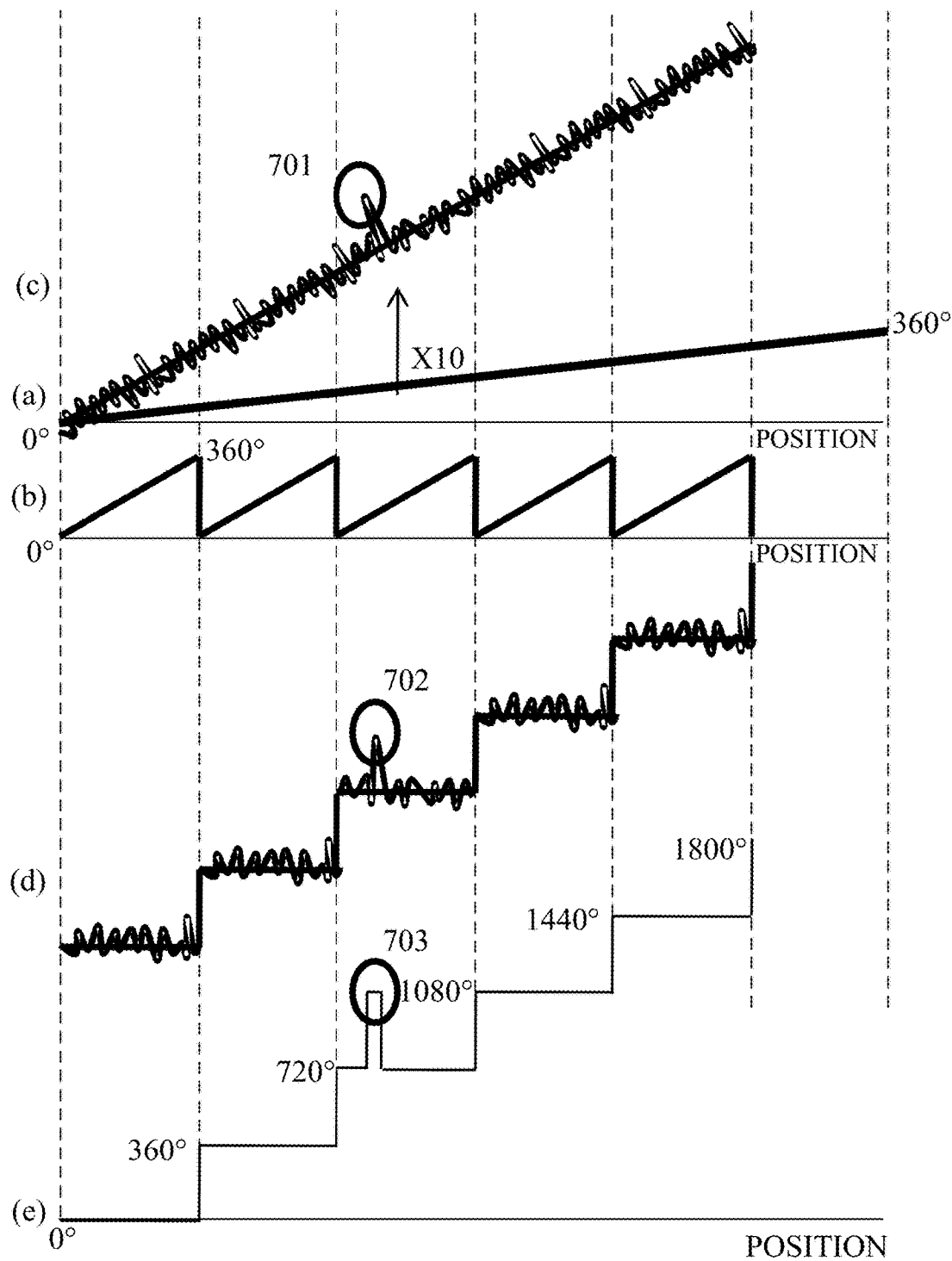
FIG. 7 illustrates a problem relating to the combining process performed on position signals in the conventional absolute position calculation process.

FIG. 7 illustrates the upper and middle level signals to be combined with each other. The combining process performed thereon is as described above. In FIG. 7, (a) denotes the upper level signal θ1-1', and (b) denotes the middle level signal θ-2'. As described at step S311, the multiplication of the upper level signal by 10 provides the signal (denoted by (c); hereinafter referred to as "a 10-multiplied signal) whose slope coincides with that of the middle level signal, and the calculation of the difference between the 10-multiplied signal and the middle level signal provides the zone signal denoted by (d).

However, if the upper level signal (denoted by (a)) includes a noise due to a reason that the optical scale 101 is unclean by a smudge (including a scratch) or dust thereon, the multiplication of the upper level signal by 10 also amplifies the noise 701 as illustrated on the 10-multiplied signal (c). As described at steps S309 and S310, the zone signal Zone(θ1) is produced by performing the combination process on the lower and lowest level signals with a multiplying factor of 4, and the zone signal Zone (θ2-2') is produced by performing the combination process on the middle and lower level signals with a multiplying factor of 7.5. As compared to these multiplying factors, the combining process performed on the upper and middle level signals uses a greater multiplying factor of 10, so that the noise is significantly amplified.

Producing the zone signal (d) from the 10-multiplied signal (c) including the amplified noise 701 leaves a noise 702 in the zone signal (d), and performing the discretizing process on this zone signal (d) generates a signal component 703 causing an erroneous zone determination. This signal component 703 makes it impossible to calculate an accurate absolute position.

According to experiments performed by the inventors, a smudge or a dust whose size is 50 µm or more existing on the optical scale 101 increased a noise level of the upper level signal to approximately ±130°, which made it impossible to provide a sufficient position detection accuracy. On the other hand, as for the middle and lower level signals, such a smudge or a dust whose size is 50 µm or more existing on the optical scale 101 increased their noise levels to only ±90° or less, which does not significantly affect the position detection accuracy.

Description will be made of a characteristic configuration in this embodiment with again referring to FIG. 1. Reference numeral 108 denotes a potentiometer (variable resister) as a second position detector that is a non-optical position detector. The potentiometer 108 is fixed to a base member 109 formed integrally with or connected integrally to the base member 104. Reference numeral 108-1 denotes a resister as a scale of the potentiometer 108, and reference numeral 108-2 denotes a slider that is slidable in contact with the resister 108-1 via a contact brush. The slider 108-2 is fixed to a movable member 110 formed integrally with or connected integrally to the movable member 102, thereby sliding with respect to the resister 108-1 with a movement of the movable member 110 (and the movable member 102)

Although in this embodiment the resister 108-1 is fixed to the base member 109 and the slider 108-2 is fixed to the movable member 110, the slider 108-2 may be fixed to the base member 109 and the resister 108-1 may be fixed to the movable member 110.

Figure 11:
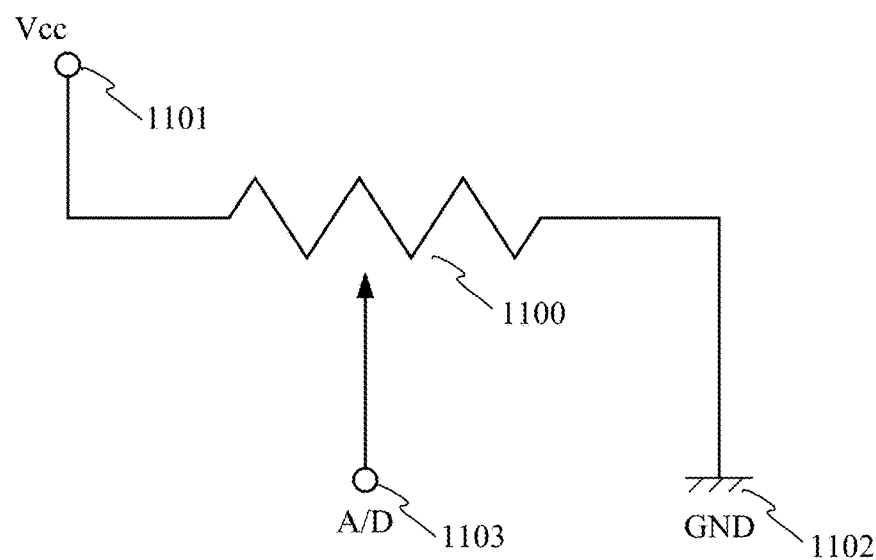
FIG. 11 illustrates a circuit of the potentiometer in Embodiment 1.

FIG. 11 illustrates a circuit of the potentiometer 108. End terminals of a resister 1100 constituting the resister 108-1 are connected respectively to a power source (Vcc) 1101 and a ground (GND) 1102. The contact brush of the slider 108-2 fixed to the movable member 110 slides with respect to the resister 1100 in contact with the resister 1100 with the movement of the movable member 110.

An electric resistance value of the potentiometer 108 changes depending on a contact position of the slider 108-2 to the resister 108-1 (resister 1100), that is, depending on a position of the movable member 110. The potentiometer 108 outputs a voltage signal generated by dividing, by its electric resistance value, the power source voltage Vcc from a voltage dividing terminal 1103, and thereby the voltage signal indicates the position of the movable member 110.

As illustrated in FIG. 1, the voltage signal from the potentiometer 108 is converted to a digital signal by an A/D converter 111, and the digital signal is input to the absolute position calculator 106. In this embodiment, the absolute position calculator 106 uses the signal from the potentiometer 108 (that is, the signal from the A/D converter 111) as an upper level signal, instead of the upper level signal θ1-1' obtained in the above-described conventional optical encoder, for the absolute position calculation.

Although in this embodiment the upper level signal is obtained from the potentiometer 108, another position signal (for example, a middle level signal) may be obtained from the potentiometer 108. It is necessary to obtain, from the potentiometer 108, a position signal affected by the unclean optical scale 101 having a smudge or dust thereon among the position signals used for the absolute position calculation.

Typical potentiometers have resolutions of about 64 divisions and thereby do not provide a sufficiently high accuracy. However, the potentiometers are hardly affected by a smudge and dust. In addition, the potentiometers output a signal obtained through voltage conversion by resister voltage division, so that the output signal therefrom is less likely to be affected by a resistance value change due to a temperature or humidity change.

Verification will be made of a validity of using the output signal from the potentiometer 108 as the upper level signal. As described above, the accuracy required for combing the upper level signal with the middle level signals is ±180°.

The middle signal has 10 folding-back points in a unit range from 0° to 360°, so that the entire scale length (that is, an entire movable range of the movable member 102) can be expressed by an accumulated angle of 3600° (=360°×10). The potentiometer 108 can divide this entire scale length with a resolution of 64 or more divisions, so that one zone has an angle of approximately 56° (3600°/64), which can achieve a required accuracy equal to or less than ±180°. In other words, the output signal from the potentiometer 108 as the upper level signal has a resolution capable of specifying one of the multiple (10) folded-back portions in the middle level signal.

Figure 8:
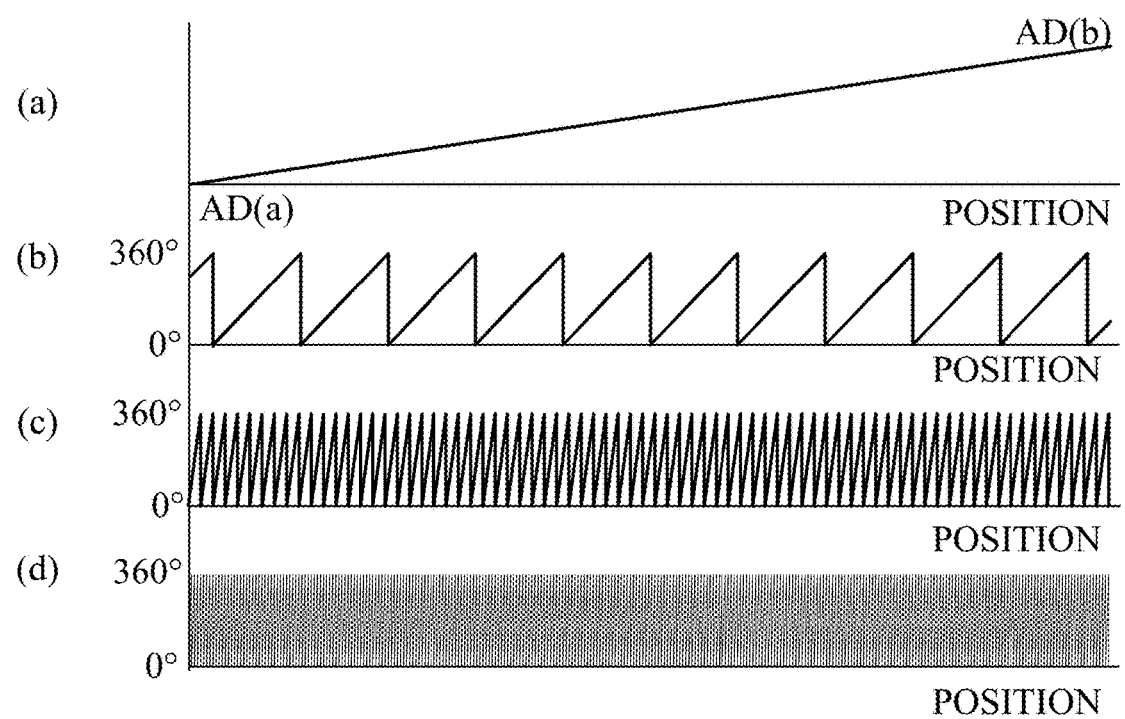
FIG. 8 illustrates an upper level signal, a middle level signal and a lower level signal in an absolute position calculation process in Embodiment 1.

FIG. 8 illustrates a relation among the upper level signal that is the output signal from the potentiometer 108 and the middle, lower and lowest level signals produced by using the output signals from the optical encoder 103. In FIG. 8, (a) denotes the upper level signal, which is used instead of the upper level signal θ1-1' denoted by (a) in FIG. 5. In FIG. 8, (b), (c) and (d) respectively denote the middle, lower and lowest level signals, which are the same signals as those denoted by (b), (c) and (d) in FIG. 5.

The upper level signal is obtained by digital converting the output signal from the potentiometer 108 by the A/D converter 111 and has an output range of 0 to 1024 corresponding to a 10-bit data length. On the other hand, the middle, lower and lowest level signals produced by using the output signals from the optical encoder 103 are angular signals in an angle range from 0 to 360° and thereby have an output range different from that of the upper level signal. Accordingly, an output range normalization for matching a unit of the output range of the upper level signal to the unit (0 to 360°) of the output range of the middle, lower and lowest level signals is required.

Furthermore, the potentiometer 108 and the optical sensor 103 are mutually independent position detectors and have mutually different scale lengths between the resister 108-1 of the potentiometer 108 and the optical scale 101 of the optical sensor 103. As described above, the combination of the upper and middle level signals requires the matching of the slopes of the upper and middle level signals for producing the zone signal. The matching of these slopes requires a scale range normalization for matching the scale range of the upper level signal to that of the middle level signal.

Figure 9:
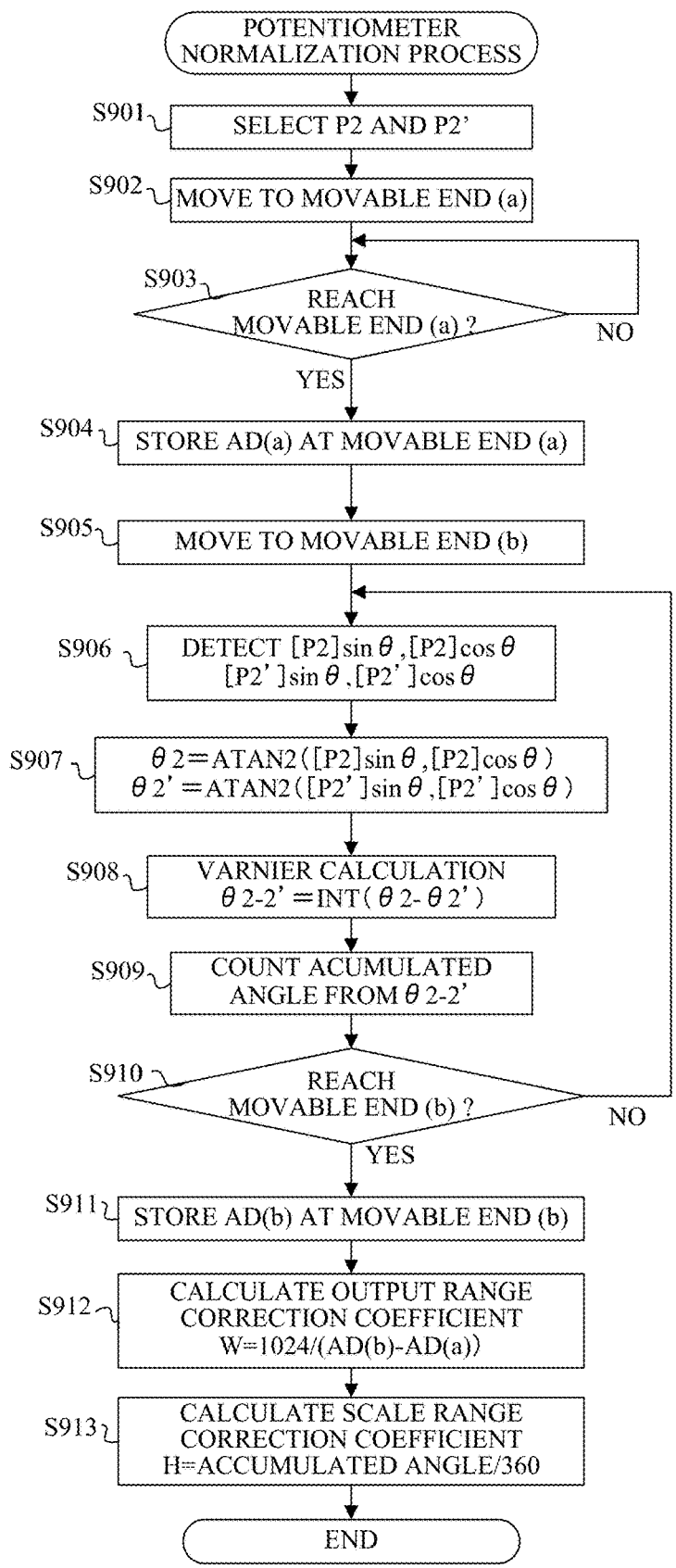
FIG. 9 illustrates a normalizing process for a potentiometer in Embodiment 1.

Processes of the output range normalization and the scale range normalization on the upper level signal obtained from the potentiometer 108 is necessary to be performed prior to the absolute position calculation. With referring to a flowchart of FIG. 9, description will be made of the output range normalization and the scale range normalization processes that the absolute position calculator 106 performs on the upper level signal obtained from the potentiometer 108. The absolute position calculator 106 executes these processes according to a computer program.

At step S901, the absolute position calculator 106 causes the first and second light receivers 103-2 and 103-3, through the pitch switching signal outputter 107, to output the signals P2 and P2'.

Next, at step S902, the absolute position calculator 106 causes the movable member 102 to move to its movable end (a). The moveable member 102 is moved, in an apparatus in which the encoder of this embodiment is installed, by being driven by an actuator or by being manually operated by a user. This also applies to step S905 below.

Next, the absolute position calculator 106 having detected at step S903 that the movable member 102 reaches the movable end (a) stores at step S904 a digital converted output AD(a) from the A/D converter 111 (that is, an output from the potentiometer 108) at the movable end (a).

Next, the absolute position calculator 106 causes at step S905 the movable member 102 to another movable end (b) opposite to the movable end (a) and samples at step S906 the signals P2 and P2' during the movement of the movable member 102. Then, the absolute position calculator 106 performs at step S907 the arctangent conversion on the signals P2 and P2'. Next, while performing the vernier calculation for obtaining the middle signal θ2-2' at step S908, the absolute position calculator 106 counts at step S909 an accumulated angle obtained from the middle level signal θ2-2'. The absolute position calculator 106 repeats the processes from step S906 to step S909 until a detection that the movable member 102 reaches the movable end (b) is made at step S910.

The absolute position calculator 106 having detected at step S910 that the movable member 102 reaches the movable end (b) stores at step S911 an output AD(b) from the potentiometer 108 at the movable end (b).

Next, at step S912, the absolute position calculator 106 calculates, by using the stored outputs AD(a) and AD(b) from the potentiometer 108, a correction coefficient W used for the output range normalization of the potentiometer 108. The absolute position calculator 106 calculates the correction coefficient W by following expression (16).

$$W = 1024/(AD(b) - AD(a)) \tag{16}$$

Next, at step S913, the absolute position calculator 106 calculates, by using the accumulated angle obtained from the middle level signal θ2-2', a correction coefficient H used for the scale range normalization of the potentiometer 108. The absolute position calculator 106 calculates the correction coefficient H by following expression (17).

$$H = (\text{accumulated angle})/360 \tag{17}$$

Thus, the output range normalization and the scale range normalization of the potentiometer 108 are completed.

Next, with referring to a flowchart of FIG. 10, description will be made of the absolute position calculation process that the absolute position calculator 106 performs using the output signal from the potentiometer 108 as the upper level signal. The absolute position calculator 106 executes the processes according to a computer program.

Figure 10:
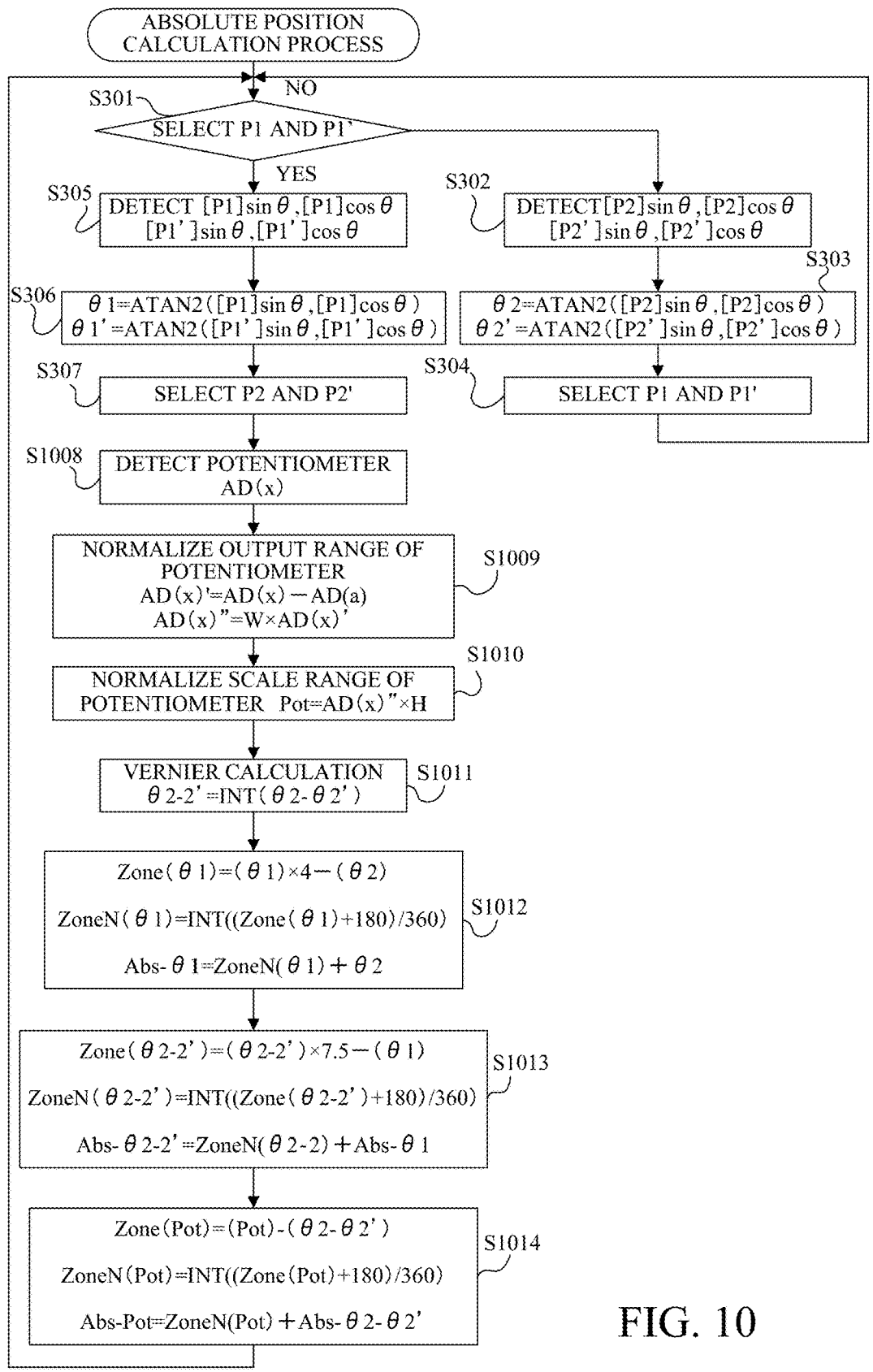
FIG. 10 illustrates a flowchart of the absolute position calculation process in Embodiment 1.

Processes from step S301 to step S306 in FIG. 10 are identical to the processes from step S301 to step S306 in FIG. 3. That is, the absolute position calculator 106 samples the signals P1, P1', P2 and P2' and performs the arctangent conversion thereon to produce the signals θ1, θ1', θ2 and θ2'.

After the process at step S306, the absolute position calculator 106 samples at step S1008 a signal AD(x) from the potentiometer 108 through the A/D converter 111. Then, at step S1009, the absolute position calculator 106 performs the output range normalization of the sampled signal AD(x). The absolute position calculator 106 performs the output range normalization by following expressions (18) and (19) using the output AD(a) from the potentiometer 108 and the correction coefficient W each obtained in the output range normalization described at step S912 in FIG. 9.

$$AD(x)'=AD(x)-AD(a) \quad (18)$$

$$AD(x)''=W \times AD(x)' \quad (19)$$

AD(x)'' is an output in the normalized output range of the potentiometer 108.

Next, at step S1010, the absolute position calculator 106 performs the scale range normalization of the potentiometer 108. The absolute position calculator 106 performs the scale range normalization by following expression (20) using the correction coefficient H obtained in the scale range normalization described at step S913 in FIG. 9.

$$Pot=H \times AD(x)'' \quad (20)$$

Pot is an output in the normalized scale range (and the normalized output range) of the potentiometer 108.

The above processes from step S1008 to step S1010 produce, from the output from the potentiometer 108, a normalized upper level signal Pot.

Next, at step S1011, the absolute position calculator 106 performs the vernier calculation to produce the middle level signal by using above-described expression (6).

Next, at steps S1012 to S1014, the absolute position calculator 106 performs combining processes on the upper, middle, lower and lowest level signals. The process at step S1012 that is the combining process on the lower and lowest level signals is identical to that at step S309 in FIG. 9. The process at step S1013 that is the combining process on the middle and lower level signals is identical to that at step S310 in FIG. 9.

The process at step S1014 is the combining process on the normalized upper level signal from the potentiometer 108 and the middle level signal from the optical sensor 103; description thereof will be made below.

[Combining Process on Normalized Upper Level Signal and Middle Level Signal at Step S1014]

The normalized upper level signal Pot corresponds to a signal obtained by multiplying a signal having one folding-back point on the optical scale 101 by 10 and has a slope identical to that of the lower level signal. The absolute position calculator 106 calculates, as shown by following expression (21), a difference between the upper level signal Pot and the middle level signal θ2-θ2' to obtain a zone signal Zone(Pot).

$$Zone(Pot)=(Pot)-(\theta 2-\theta 2') \quad (21)$$

The absolute position calculator 106 further performs a discretizing process on the zone signal by following expression (22) to remove a noise.

$$ZoneN(Pot)=INT((Zone(Pot)+180)/360) \quad (22)$$

Next, the absolute position calculator 106 adds the middle level combined signal Abs-(θ2-2') produced at step S1013 to the discretized zone signal ZoneN(Pot) as shown by following expression (23) to calculate an upper level combined signal Abs-(Pot) in which the upper and middle level signals are combined with each other.

$$Abs-(Pot)=ZoneN(Pot)+(Abs-(\theta 2-2')) \quad (23)$$

The middle level combined signal Abs-(θ2-2') is produced by combining the middle, lower and lowest level signals, and therefore the upper level combined signal Abs-(Pot) corresponds to a signal obtained by combining together all the upper, middle, lower and lowest level signals. Accordingly, the upper level combined signal Abs-(Pot) has the same resolution as that of the lowest level signal and the same scale range as that of the upper level signal. The series of the above-described processes produces an absolute position signal (upper level combined signal) Abs-(Pot) that is a signal showing the absolute position of the movable member 102 (110).

This embodiment produces the upper level signal by using, instead of the output from the optical sensor 103 likely to be affected by a smudge and dust, the output signal from the potentiometer 108 hardly affected by the smudge and dust and produces the other signals such as the middle, lower and lowest signals by using the output signals from the optical sensor 103. Accordingly, this embodiment can realize a highly reliable encoder less likely to be affected by the smudge and dust.

In other words, this embodiment calculates an absolute position by using together a first position signal obtained from an optical position detector likely to provide a high resolution and a second position signal obtained from a non-optical position detector less likely to be affected by a smudge and dust. Therefore, this embodiment can realize an encoder with a high reliability against the smudge and dust.

Although this embodiment described the case of using in the absolute position calculation, the four kinds of signals, that is, the upper, middle, lower and lowest level signals, alternative embodiments of the present invention may use one kind of signal or five or more kinds of signals. This also applies to other embodiments described below.

Furthermore, this embodiment described the case of using the potentiometer as the second position detector, alternative embodiments of the present invention may use, as the second position detector, other position detectors than the optical position detector, such as a magnetic position detector and a capacitance position detector. This also applies to the other embodiments described below.

Embodiment 2

Next, description will be made of an encoder as a position detection apparatus that is a second embodiment (Embodiment 2) of the present invention. The encoder of this embodiment includes, as well as Embodiment 1, a first position detector (a) being an optical position detector used with an optical scale provided with multiple periodic patterns whose periods are mutually different and (b) configured to receive lights from the multiple periodic patterns when moving relatively to the optical scale with a movement of a movable member to generate multiple first detection signals respectively changing at periods corresponding to the periods of the multiple periodic patterns; a second position detector being a non-optical position detector and configured to generate a second detection signal changing with the movement of the movable member; and a calculator configured to (a) produce a first position signal by using the multiple first detection signals, (b) produce a second position signal whose resolution is different from that of the first position signal, by using the second detection signal, and (c) perform a calculation for combining the first position signal with the second position signal to produce a signal showing an absolute position of the movable member. The encoder of this embodiment further includes a corrector configured to calculate a correction gain depending on a ratio of the first and second position signals and to correct the absolute position signal by using the correction gain to produce a corrected absolute position signal.

Figure 12:
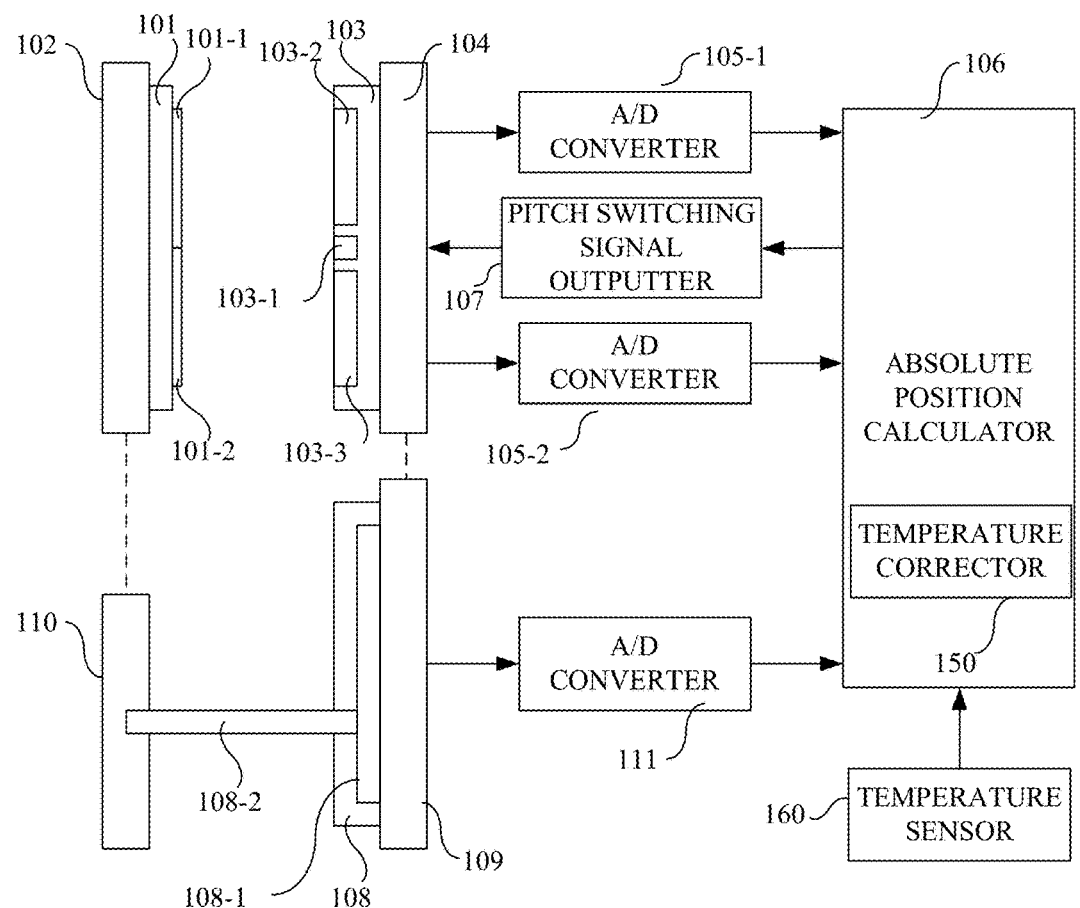
FIG. 12 is a block diagram illustrating a configuration of an encoder that is Embodiment 2 of the present invention.

FIG. 12 illustrates a configuration of the encoder of Embodiment 2. In FIG. 12, components identical to those described in Embodiment 1 (illustrated in FIG. 1) are denoted by the same reference numerals as those in Embodiment 1. In the encoder of this embodiment, the absolute position calculator 106 also performs the normalization process illustrated in FIG. 9 in Embodiment 1 and the absolute position calculation process illustrated in FIG. 10 in Embodiment 1.

(Temperature Correction Process)

This embodiment first describes erroneous position detection due to an expansion and a contraction of the optical scale 101 with environmental temperature variations and describes a correction process therefor.

In the potentiometer 108 illustrated in FIG. 11 in Embodiment 1, an entire resistance value of the resister 1100 changes with the temperature variations, but the output (voltage) from the voltage dividing terminal 1103 is a voltage corresponding to its voltage dividing ratio and thereby hardly changes with the temperature variations.

Figure 13:
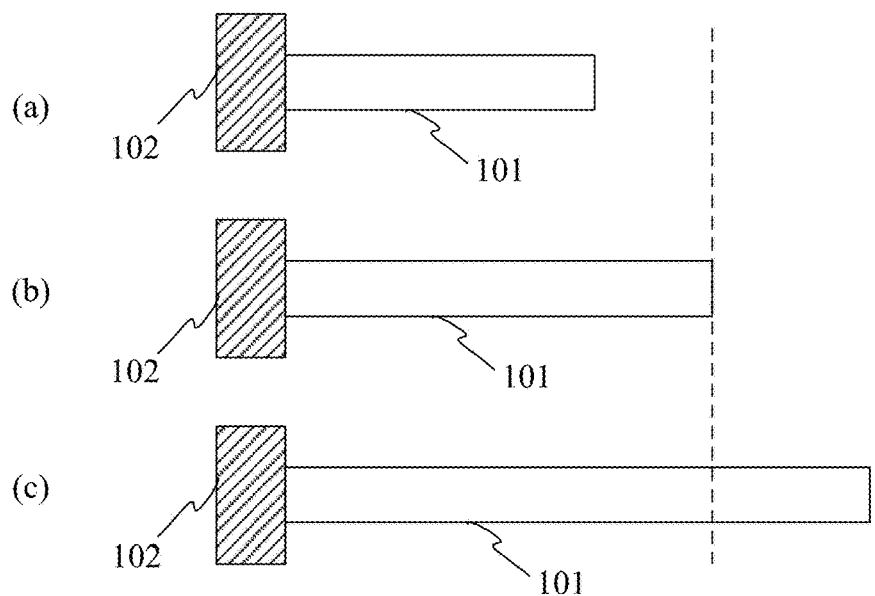
FIG. 13 illustrates an expansion and a contraction of an optical scale due to a temperature change in Embodiment 2.

FIG. 13 illustrates an expansion and a contraction of the optical scale 101 due to the temperature variations. The optical scale 101 is fixed at its fixed end (first position) to the movable member 102. Another end (expansion-contraction end) of the optical scale 101 opposite to the fixed end is not fixed to the movable member 102 so as to allow the expansion and contraction of the optical scale 101 and is pressed onto the movable member 102 by a biasing force from a plate spring or the like.

In FIG. 13, an upper part (a), a middle part (b) and a lower part (c) respectively illustrate lengths (scale lengths) from the fixed end to the expansion-contraction end of the optical scale 101 at a low temperature, a normal temperature and a high temperature. The scale length at the low temperature illustrated in the upper part (a) is shorter than that at the normal temperature illustrated in the middle part (b), and the scale length at the high temperature illustrated in the lower part (c) is longer than that at the normal temperature. That is, the expansion-contraction end is located, as compared to at the normal temperature, closer to the fixed end at the low temperature and farther from the fixed end at the high temperature. The expansion and contraction of the optical scale 101 changes, as illustrated in FIG. 14, the absolute position of the movable member 102 shown by the absolute position signal produced by the absolute position calculator 106 by using the output signals from the optical sensor 103.

Although this embodiment fixes the optical scale 101 at its one end (fixed end) to the movable member 102, the optical scale 101 may be fixed at its middle position (first position) in the position detection direction to the movable member 102.

Figure 14:
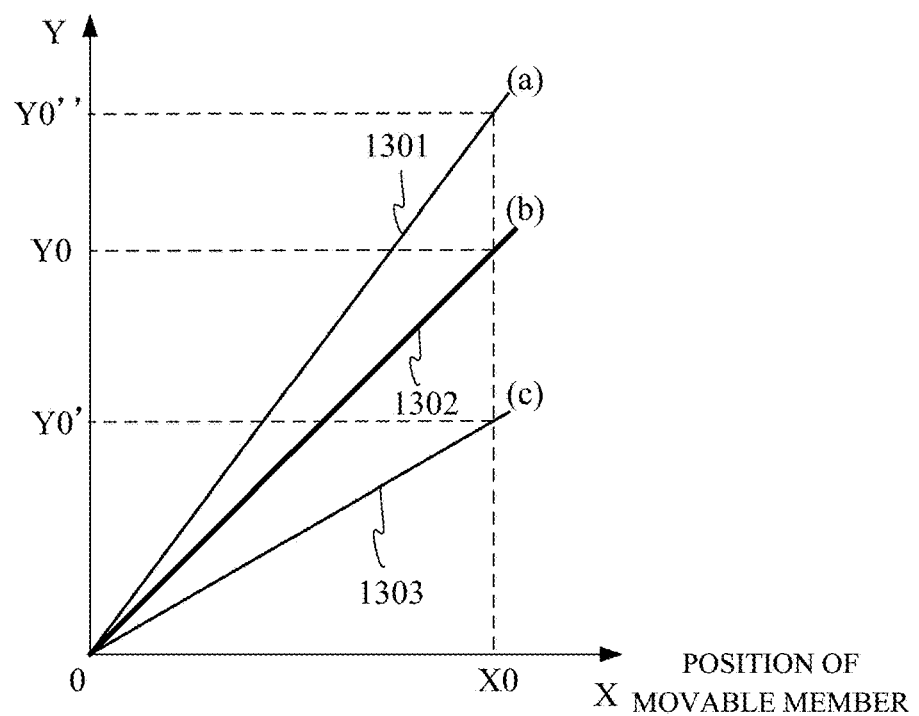
FIG. 14 illustrates changes of a detected position due to the expansion and contraction of the optical scale in Embodiment 2.

In FIG. 14, a horizontal axis represents true positions X of the movable member 102, and a vertical axis represents absolute positions (hereinafter referred to as "calculated absolute positions") Y shown by the absolute position signal produced by the absolute position calculator 106. Graphs 1301, 1302 and 1303 respectively show relations between the true positions X and the calculated absolute positions Y with respect to the scale lengths at the low, normal and high temperatures illustrated in the upper, middle and lower parts (a), (b) and (c) in FIG. 13.

The calculated absolute positions Y with respect to a true position X0 of the movable member 102 are Y0", Y0, Y0' (Y0">Y0>Y0') at the low, normal and high temperatures. That is, even though the true position of the movable member 102 does not change, the calculated absolute positions Y at the low and high temperatures shift to mutually opposite sides with respect to that at the normal temperature. Thus, the environmental temperature change causes a variation (error) of the calculated absolute position, that is, the above-mentioned erroneous position detection.

In the following, description will be made of the correction process (temperature correction process) for correcting the error of the calculated absolute position caused with the environmental temperature change.

In FIG. 12, reference numeral 150 denotes a temperature corrector as a corrector. The temperature corrector 150 is provided in the absolute position calculator 106 and performs the temperature correction process on the calculated absolute position (absolute position signal) obtained in the absolute position calculator 106. The temperature corrector 150 may be provided separately from the absolute position calculator 106. Reference numeral 160 denotes a temperature sensor as a temperature detector. The temperature sensor 160 detects an environmental temperature around the encoder to output an electric signal corresponding to the detected environmental temperature.

Figure 15:
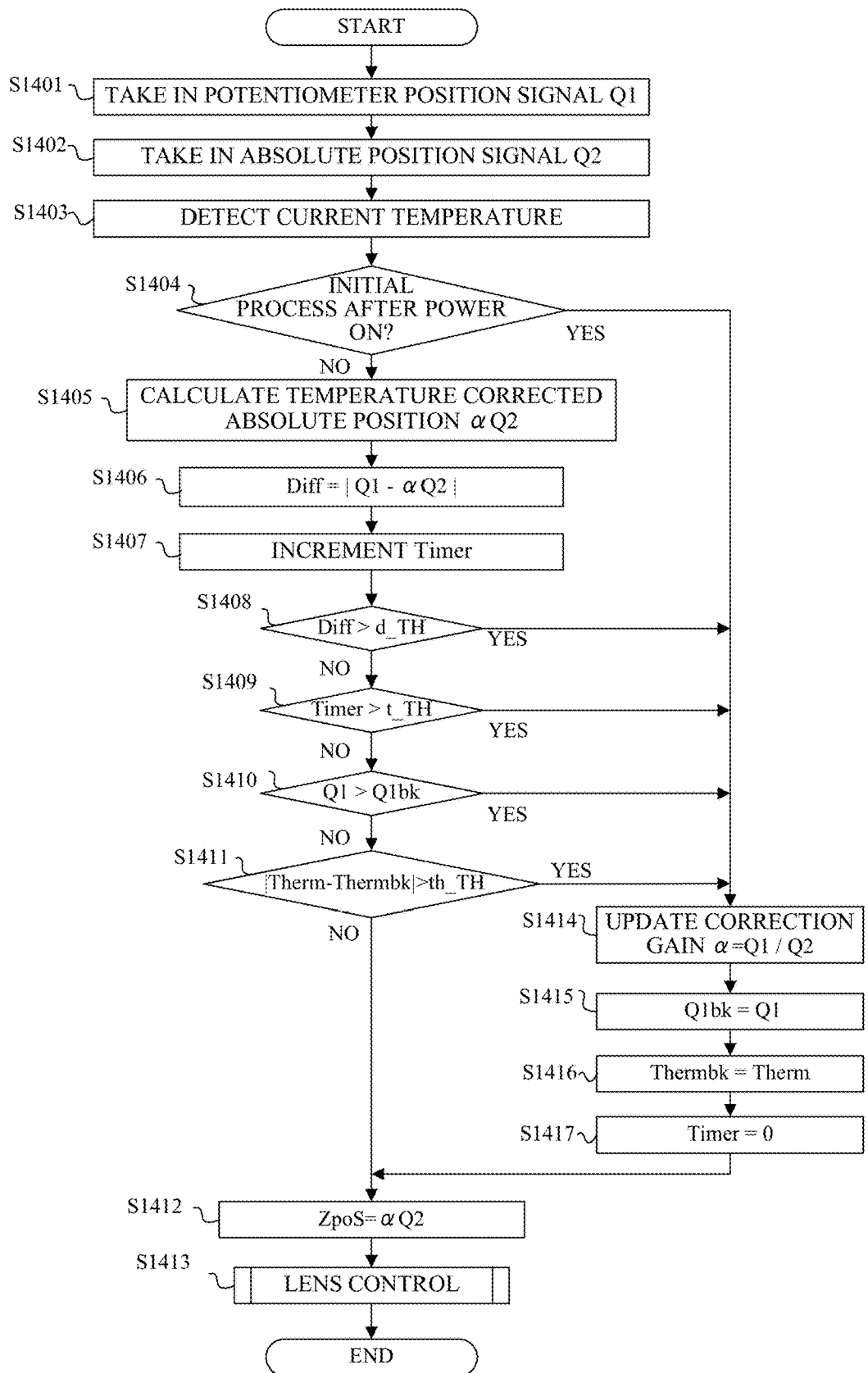
FIG. 15 illustrates a flowchart of a temperature correction process in Embodiment 2.

Description will be made of the temperature correction process performed by the temperature corrector 150 with referring to a flowchart of FIG. 15. The temperature corrector 150 performs this process according to a computer program. The following description will be made of a case where the encoder is used for detecting a position of a movable lens in an image capturing apparatus later described in Embodiment 5. The movable member 102 (110) is moved integrally or in conjunction with the movable lens.

At step S1401, the temperature corrector 150 takes in a value Q1 of the position signal (second position signal) Pot from the potentiometer 108. The position signal Pot corresponds to the above-described normalized upper level signal.

Next, at step S1402, the temperature corrector 150 takes in a value Q2 of the absolute position signal Abs-(Pot) produced by the absolute position calculator 106 and showing the calculated absolute position.

Next, at step S1403, the temperature corrector 150 acquires an output (detected temperature) Therm from the temperature sensor 160.

Next, at step S1404, the temperature corrector 150 determines whether or not a current process is an initial (first) process after power-on of the image capturing apparatus. If the current process is the initial process, the temperature corrector 150 proceeds to step S1414, and otherwise proceeds to step S1405.

Figure 16:
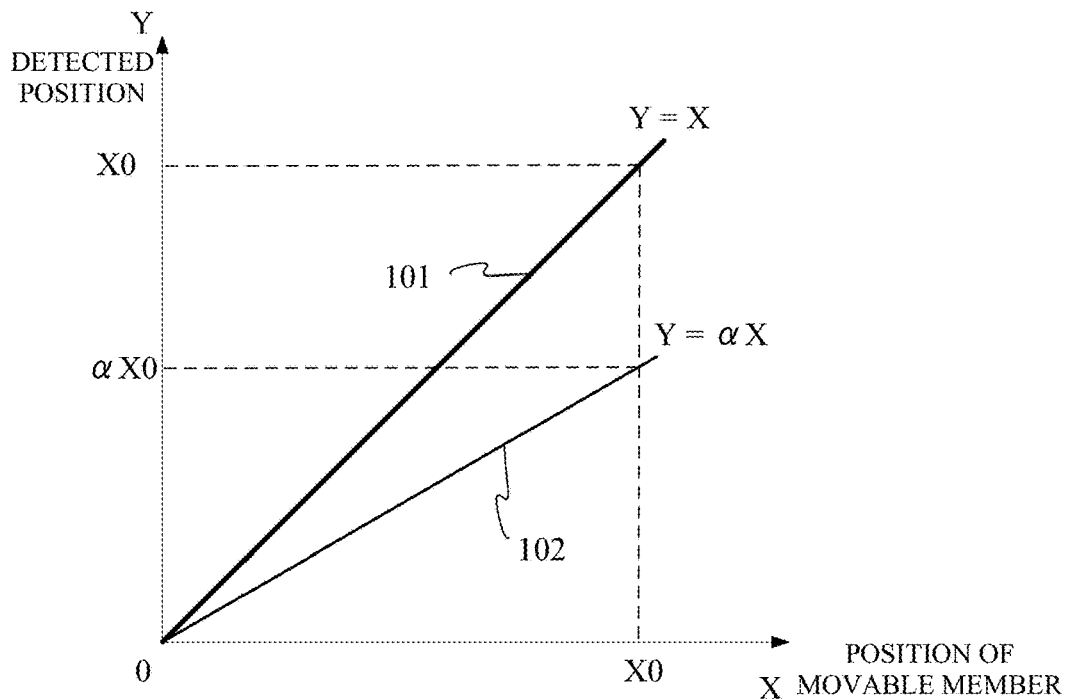
FIG. 16 illustrates a position signal from a potentiometer and an absolute position signal from an absolute position calculator under mutually different environments in Embodiment 2.

At step S1414, the temperature corrector 150 calculates a temperature correction gain α as the correction gain. Description will be made of a method of calculating the temperature correction gain α with referring to FIG. 16. FIG. 16 illustrates a relation between an actual position of the movable member 102 (110) at a certain temperature T represented along a horizontal axis (X axis) and the value Q1 of the position signal from the potentiometer 108 and the value Q2 of the absolute position signal produced by the absolute position calculator 106 which are represented along a vertical axis (Y axis).

In FIG. 16, a graph 1501 shows the relation between the value Q1 and the actual position of the movable member 102. This relation is a linear relation and is hardly changed by the temperature change as described above, so that a relation of Q1=Y approximately establishes a relation shown by following expression (24).

$$Y = X \tag{24}$$

A graph 1502 shows the relation between the value Q2 and the actual position of the movable member 102. This relation is a linear relation, but its slope (proportional constant) is changed by the temperature change. When α represents a slope of the graph (straight line) 1502 at the temperature T, a relation of Q2=Y approximately establishes a relation shown by following expression (25).

$$Y = \alpha X \tag{25}$$

Description will be made of the proportional constant α at a certain position X0 of the movable member 102. At the position X0 of the movable member 102, the value Q1 of the position signal from the potentiometer 108 and the value Q2 of the absolute position signal produced by the absolute position calculator 106 are, from expressions (24) and (25), X0 and αX0, respectively. This relation establishes at a certain temperature a relation between Q1 and Q2 shown by following expression (26).

$$Q1/Q2 = \alpha \tag{26}$$

That is, α corresponds to a ratio of Q1 to Q2.

The above description makes clear that multiplying the value Q2 of the absolute position signal produced by the absolute position calculator 106 by α provides the value Q1 of the position signal from the potentiometer 108. The value Q1 of the position signal from the potentiometer 108 corresponds to the actual position of the movable member 102 as shown by expression (24), so that the multiplication of the value Q2 of the absolute position signal produced by the absolute position calculator 106 by α enables converting the value Q2 into the actual position of the movable member 102.

The right side of expression (26) does not include an X term, and therefore the relation shown by expression (26) is established even when the movable member 102 is located at any position. That is, regardless of the position of the movable member 102, multiplying the value Q2 of the absolute position signal produced by the absolute position calculator 106 by α provides the actual position αX of the movable member 102 at the temperature T. This α is the temperature correction gain.

The temperature corrector 150 having calculated α at step S1414 the temperature correction gain α by expression (26) stores at step S1415 a value Q1bk as a backup value of the value Q1 of the position signal from the potentiometer 108 when updating the temperature correction gain α.

Next, at step S1416, the temperature corrector 150 stores the output Therm from the temperature sensor 160 as a backup value Thermbk.

Next, at step S1417, the temperature corrector 150 clears a value of a timer counter Timer.

Next, the temperature corrector 150 having determined at step S1404 that the current process is a second or subsequent process performs at step S1405 a temperature correction by following expression (27) on the vale Q2 of the absolute position signal produced by the absolute position calculator 106 and taken in at step S1402. The temperature corrector 150 thereby obtains an absolute position signal subjected to the temperature correction (hereinafter referred to as "a temperature corrected absolute position signal").

Value of temperature corrected absolute position signal=αQ2 (27)

The temperature correction gain α is calculated by the same method as that described at step S1414

Next, at step S1406, the temperature corrector 150 calculates, by following expression (28), a position difference Diff that is an absolute value of a difference between the value Q1 of the position signal from the potentiometer 108 obtained at step S1401 and the value αQ2 of the temperature corrected absolute position signal obtained at step S1405.

$$Diff = |Q1 - \alpha Q2| \tag{28}$$

Next, at step S1407, the temperature corrector 150 counts up the timer counter Timer. An initial value of the timer counter Timer at the power-on of the image capturing apparatus is 0.

Next, at steps S1408 to S1411, the temperature corrector 150 determines whether or not to update the temperature correction gain α. First, at step S1408, the temperature corrector 150 determines whether or not the position difference Diff calculated at step S1406 is larger than a predetermined value d TH. A determination that the position difference Diff as the difference between the Q1 of the position signal from the potentiometer 108 and the value αQ2 of the temperature corrected absolute position signal is larger than the predetermined value d TH shows that the temperature corrected absolute position signal as a correction result is inappropriate. In this case, the temperature corrector 150 returns to step S1414 to recalculate the temperature correction gain α. If a determination is made that the position difference Diff is equal to or smaller than the predetermined value d TH, the temperature corrector 150 proceeds to step S1409.

At step S1409, the temperature corrector 150 determines whether or not the timer counter Timer has reached a predetermined time t_TH. If the timer counter Timer has reached the predetermined time t_TH, the temperature corrector 150 proceeds to step S1414 to reset the temperature correction gain α, and otherwise proceeds to step S1410. Thus, the temperature corrector 150 calculates the temperature correction gain α at every predetermined time t_TH.

At step S1410, the temperature corrector 150 checks a magnitude relation between the backup value Q1bk (stored at step S1415) of the position signal from the potentiometer 108 at the update of the temperature correction gain α and a currently obtained value Q1 of the position signal from the potentiometer 108. This process is to confirm which one of Q1 and Q1bk is located farther from the fixed end of the optical scale 101. If Q1 is located farther from the fixed end than Q1bk (Q1>Q1bk), the temperature corrector 150 proceeds to step S1414. If Q1 is located closer to the fixed end than Q1bk (Q1<Q1bk), the temperature corrector 150 proceeds to step S1411.

At step S1411, the temperature corrector 150 determines whether or not an absolute value of a difference between the detected temperature Therm taken in from the temperature sensor 160 at step S1403 and the backup value Thermbk of the detected temperature stored in a previous process is larger than a predetermined temperature th_TH. If the absolute value of the difference is larger than the predetermined temperature th_TH, the temperature corrector 150 proceeds to step S1414, and otherwise proceeds to step S1412. That is, the temperature corrector 150 calculates the temperature correction gain α when a change amount of the detected temperature from the temperature sensor 160 is larger than a predetermined amount (th_TH).

The temperature corrector 150 having proceeded from steps S1408, S1409, S1410 and S1411 to step S1414 calculates and updates at step S1405 the temperature correction gain α by expression (26) using the value Q2 of the absolute position signal produced by the absolute position calculator 106.

Next, as step S1412, the temperature corrector 150 corrects the value Q2 of the absolute position signal produced by the absolute position calculator 106 by using the temperature correction gain α as shown by following expression (29) to calculate an absolute position Zpos of the movable member 102.

$$Zpos = \alpha Q2 \quad (29)$$

Thus, the temperature correction process performed by the temperature corrector 150 on the absolute position signal produced by the absolute position calculator 106 is completed.

Next, at step S1413, the temperature corrector 150 outputs, to a camera microcomputer provided in the image capturing apparatus, the temperature corrected position Zpos of the movable member 102 calculated at step S1412. The camera microcomputer performs various lens control processes by using the position Zpos. The lens control processes include a zoom tracking process for moving a focus lens when the movable lens is a magnification-varying lens, an autofocus process for controlling a position of the focus lens when the movable lens is the focus lens, and others.

This embodiment corrects the absolute position signal by using the temperature correction gain that depends on a ratio of the first position signal affected by the expansion and contraction of the optical scale and the second position signal not affected thereby. Therefore, this embodiment can realize a position detection apparatus capable of accurate position detection even when the optical scale expands or contracts due to a temperature change.

Embodiment 3

Next, description will be made of an encoder as a position detection apparatus that is a third embodiment (Embodiment 3) of the present invention. The encoder of this embodiment includes, as well as Embodiment 1, a first position detector (a) being an optical position detector used with an optical scale provided with multiple periodic patterns whose periods are mutually different and (b) configured to receive lights from the multiple periodic patterns when moving relatively to the optical scale with a movement of a movable member to generate multiple first detection signals respectively changing at periods corresponding to the periods of the multiple periodic patterns; a second position detector being a non-optical position detector and configured to generate a second detection signal changing with the movement of the movable member; and a calculator configured to (a) produce a first position signal by using the multiple first detection signals, (b) produce a second position signal whose resolution is different from that of the first position signal, by using the second detection signal, and (c) perform a calculation for combining the first position signal with the second position signal to produce a signal showing an absolute position of the movable member. The encoder of this embodiment further includes a selector configured to select, as a signal indicating a position of the movable member, the absolute position signal when a difference between the absolute position signal and the second position signal is smaller than a predetermined value and to select, as the signal indicating the position of the movable member, the second position signal when the difference is larger than the predetermined value.

Figure 17:
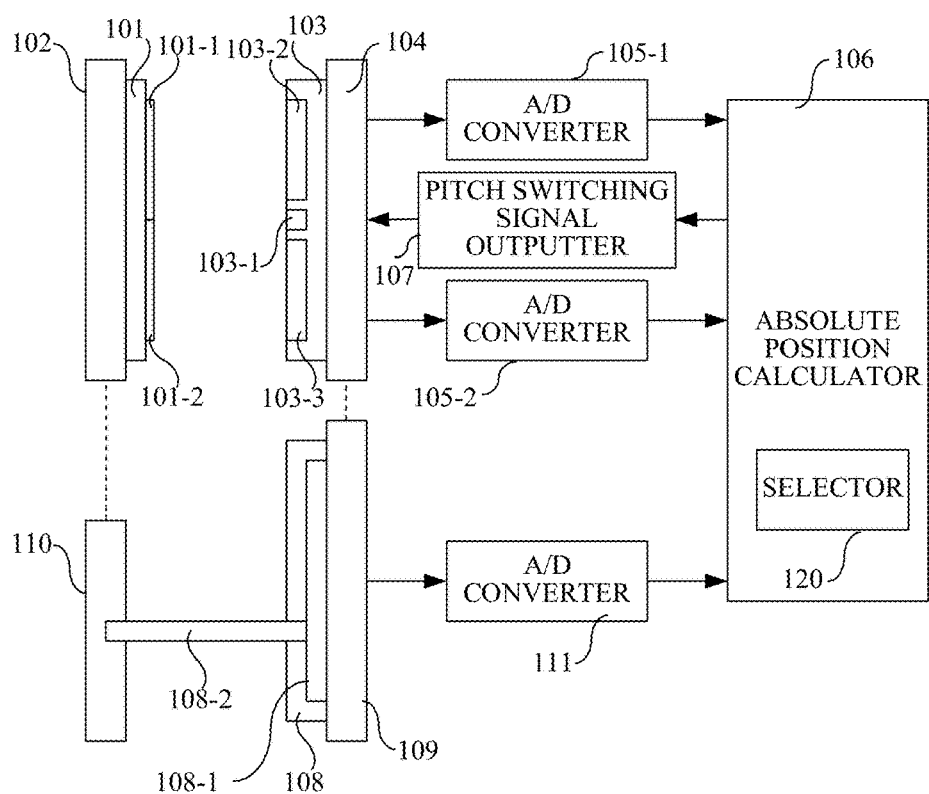
FIG. 17 is a block diagram illustrating a configuration of an encoder that is Embodiment 3 of the present invention.

FIG. 17 illustrates a configuration of the encoder of Embodiment 3. In FIG. 17, components identical to those described in Embodiment 1 (illustrated in FIG. 1) are denoted by the same reference numerals as those in Embodiment 1. Also in the encoder of this embodiment, the absolute position calculator 106 performs the normalization process illustrated in FIG. 9 in Embodiment 1 and the absolute position calculation process illustrated in FIG. 10 in Embodiment 1.

(Foreign Substance Determining Process on Optical Scale and Erroneous Position Detection Avoiding Process)

The configuration and process described in Embodiment 1 enables avoiding the influence of the smudge and dust on the upper level signal. However, it is also necessary to avoid such an influence of the smudge and dust (hereinafter referred to collectively as "a foreign substance") on the optical scale 101 for the middle, lower and lowest level signals (first signals) produced from the output signals from the optical sensor 103. In the following, description will be made of a configuration and a process (foreign substance determining process) for determining an existence of the foreign substance on the optical scale 101 and a process (erroneous position detection avoiding process) for avoiding erroneous position detection due to the foreign substance.

In FIG. 17, reference numeral 120 denotes a selector provided in the absolute position calculator 106. The selector 120 performs the foreign substance determining process and selects, depending on a result of the foreign substance determining process, whether to output the absolute position signal produced by the absolute position calculator 106 or the position signal that is the output signal from the potentiometer 108 (A/D converter 111). The selector 120 may be provided separately from the absolute position calculator 106. In this case, the selector 120 has to perform a process for normalizing the position signal from the potentiometer 108 with respect to the output and scale ranges of the optical sensor 103.

Figure 18:
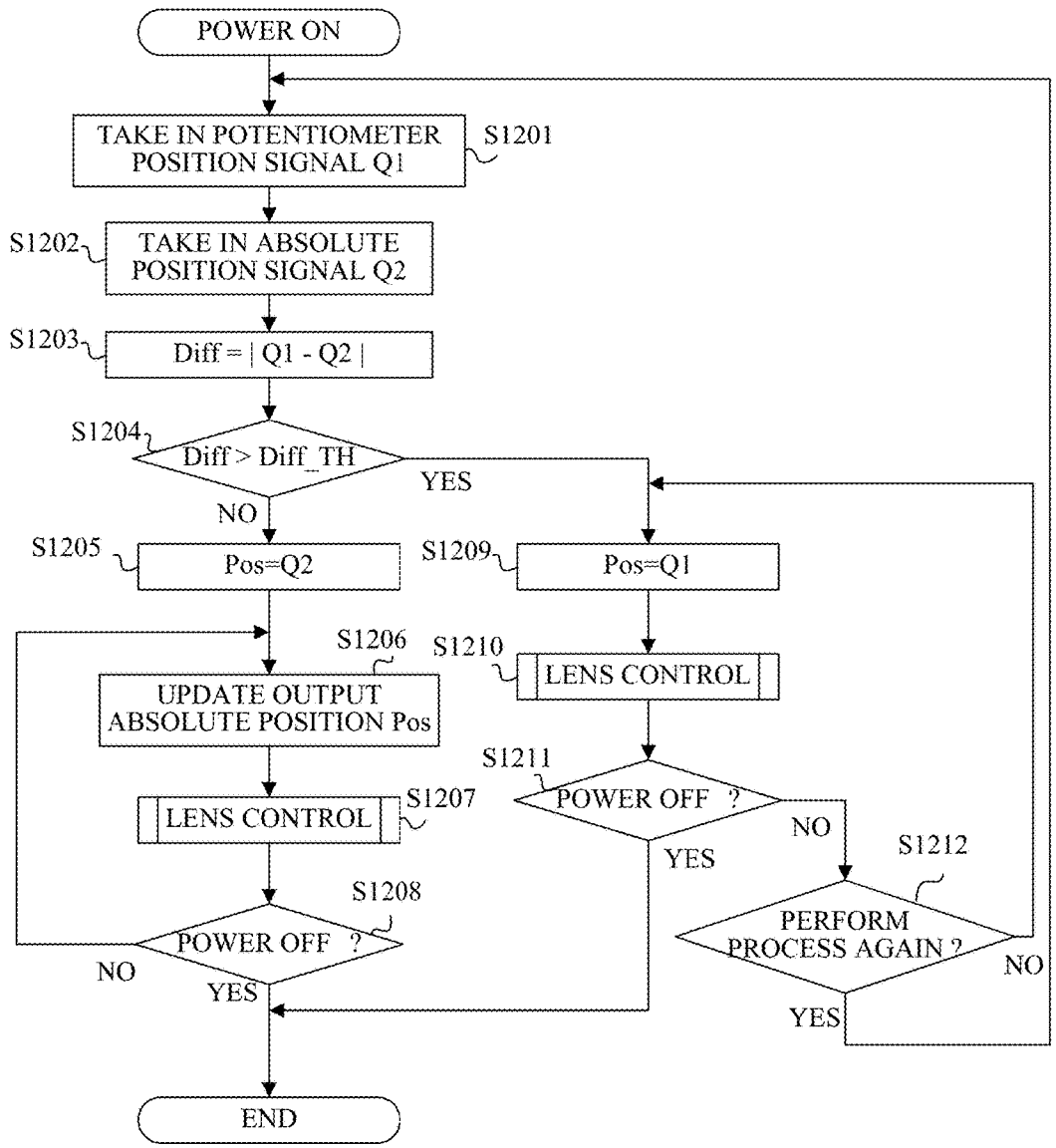
FIG. 18 illustrates a flowchart of a foreign substance determining process and a position error avoiding process in Embodiment 3.

Description will be made of the foreign substance determining process performed by the selector 120 with referring to a flowchart of FIG. 18. The selector 120 performs this process according to a computer program. The following description will be made of a case where the encoder is used for detecting a position of a movable lens in an image capturing apparatus later described in Embodiment 5. The movable member 102 (110) is moved integrally or in conjunction with the movable lens.

In response to power-on of the image capturing apparatus, the selector 120 takes in at step S1201 a value Q1 of the position signal (second position signal) Pot from the potentiometer 108. The position signal Pot corresponds to the above-described normalized upper level signal.

Next, at step S1202, the selector 120 takes in a value Q2 of the absolute position signal Abs-(Pot) produced by the absolute position calculator 106.

Next, at step S1203, the selector 120 calculates, by following expression (30), a position difference Diff that is an absolute value of a difference between the Q1 of the position signal taken in at step S1201 and the value Q2 of the absolute position signal taken in at step S1202.

$$Diff=|Q1-Q2| \quad (30)$$

Next, at step S1204, the selector 120 determines whether or not the position difference Diff calculated at step S1203 is larger than a predetermined value (threshold) Diff_TH.

Figure 19:
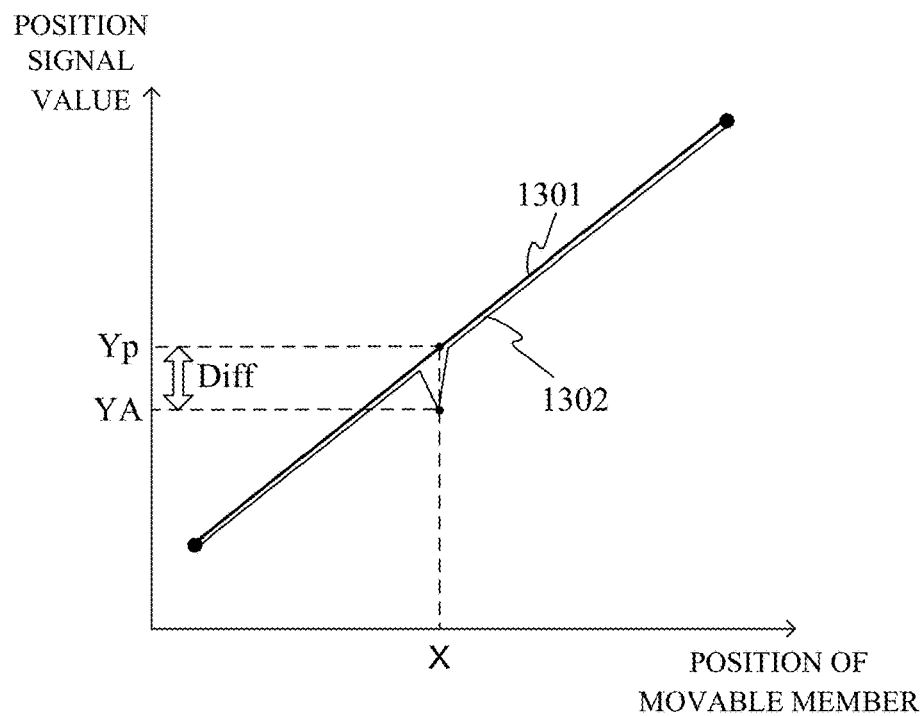
FIG. 19 illustrates an output of a potentiometer and an output of an optical sensor affected by a foreign substance in Embodiment 3.

Description will be made of the processes performed at steps S1203 and S1204 with referring to FIG. 19. FIG. 19 illustrates a relation between the position of the movable member 102 (110) represented along a horizontal axis and the value (Q1) 1301 of the position signal from the potentiometer 108 and the value (Q2) 1302 of the absolute position signal produced by the absolute position calculator 106 which are represented along a vertical axis. Although the position signal from the potentiometer 108 has a coarser resolution than that of the absolute position signal produced by the absolute position calculator 106, these position signals are illustrated in FIG. 19 so as to have mutually identical resolutions for simplification.

In a case where the movable member 102 is moved to a certain position X, if the value of the absolute position signal produced by the absolute position calculator 106 becomes Ya due to an influence of a foreign substance on the optical scale 101 and the value of the position signal from the potentiometer 108 when the movable member 102 (110) is located at the position X is Yp, the position difference Diff(X) is calculated by following expression (31) using Ya and Yp.

$$Diff(X)=|Yp-Ya| \quad (31)$$

The potentiometer 108 is less likely to be affected by the foreign substance as described above. If the foreign substance does not exist on the optical scale 101, the position difference Diff is equal to or smaller than the predetermined value Diff_TH. Accordingly, the position difference Diff larger than the predetermined value Diff_TH shows that the foreign substance exists on the optical scale 101 and therefore enables determining that the absolute position calculator 106 outputs an erroneous position Ya due to its influence.

Figure 20:
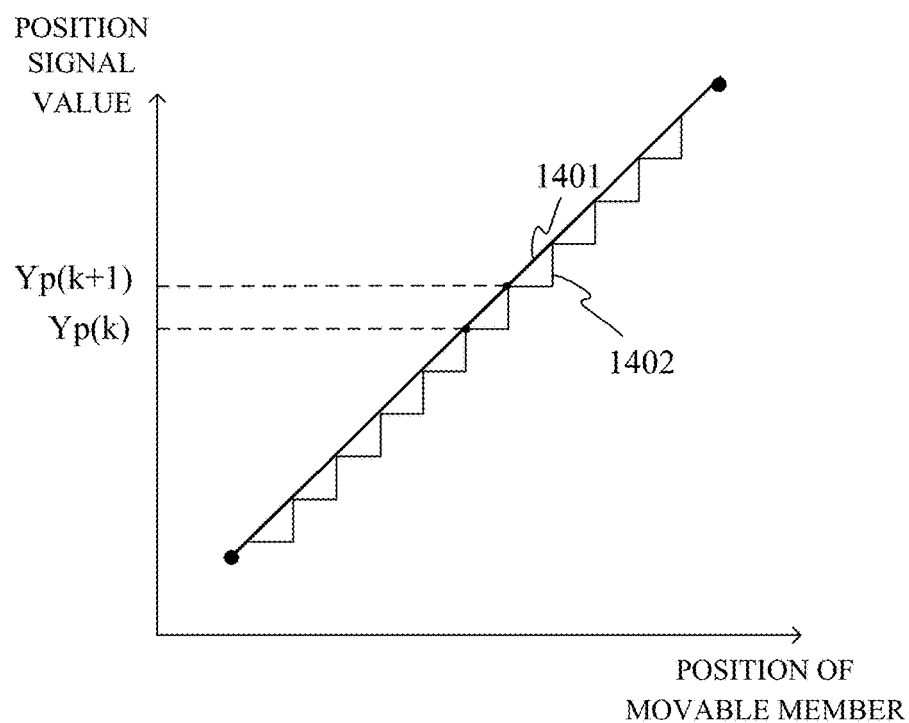
FIG. 20 illustrates an output of the potentiometer and an output of the optical sensor in Embodiment 3.

Description will be made of a method of setting the predetermined value Diff_TH with referring to FIG. 20. FIG. 20 illustrates a relation between an actual position of the movable member 102 (110) represented along a horizontal axis and the value (Q1) 1402 of the position signal from the potentiometer 108 and the value (Q2) 1401 of the absolute position signal produced by the absolute position calculator 106 which are represented along a vertical axis. The position signal (1402) from the potentiometer 108 having a coarser resolution than that of the absolute position signal (1401) produced by the absolute position calculator 106 is a stepwise signal.

The predetermined value Diff_TH is set by following expression (32) on a basis of the resolution of the potentiometer 108:

$$Diff\_TH=|Yp(k+1)-Yp(k)|+\beta \quad (32)$$

where p(k) and p(k+1) represent values Yp of the position signal from the potentiometer 108 at mutually adjacent positions resolvable with the resolution of the potentiometer 108, and β represents a margin given with a consideration of an influence of a noise or the like. The margin β is 0 or more.

The selector 120 having determined at step S1204 that the position difference Diff is larger than the predetermined value Diff_TH, that is, that the foreign substance exists on the optical scale 101 proceeds to step S1209. The selector 120 having determined that the position difference Diff is equal to or smaller than the predetermined value Diff_TH proceeds to step S1205.

At step S1205, the selector 120 sets the value Q2 of the absolute position signal taken in from the absolute position calculator 106 at step S1202, to the absolute position Pos. Furthermore, the selector 120 takes in the lowest level signal θ2 from the absolute position calculator 106 and then proceeds to step S1206.

At step S1206, the selector 120 increments or decrements the absolute position Pos depending on a change of the lowest level signal θ2 and its direction (plus or minus direction) to update an absolute position Pos to be output.

Next, at step S1207, the selector 120 outputs the absolute position Pos to a camera microcomputer provided in the image capturing apparatus. The camera microcomputer performs various lens control processes by using the position Pos. The lens control processes include a zoom tracking process for moving a focus lens when the movable lens is a magnification-varying lens, an autofocus process for controlling a position of the focus lens when the movable lens is the focus lens, and others.

Next, at step S1208, the selector 120 determines whether or not the power of the image capturing apparatus is turned off. If the power of the image capturing apparatus is not turned off, the selector 120 repeats the processes at steps S1206 and S1207. If the power of the image capturing apparatus is turned off, the selector 120 ends this process.

On the other hand, the selector 120 having proceeded to step S1209 since the position difference Diff is larger than the predetermined value Diff_TH outputs, as the erroneous position detection avoiding process, the value Q1 of the position signal from the potentiometer 108 taken in at step S1201, as the absolute position Pos of the movable member 102.

Next, at step S1210, the selector 120 outputs the absolute position Pos to the above-described camera microcomputer. The camera microcomputer performs the various lens control processes by using the position Pos as described at step S1207.

Then, at step S1211, the selector 120 determines whether or not the power of the image capturing apparatus is turned off. If the power of the image capturing apparatus is not turned off, the selector 120 proceeds to steps S1212. If the power of the image capturing apparatus is turned off, the selector 120 ends this process.

At step S1212, the selector 120 determines whether or not to perform the foreign substance determining process again. The foreign substance determining process is performed again when the movable lens or the movable member 102 (110) is moved and thereby the value Q1 of the position signal from the potentiometer 108 is changed by a change amount equal to larger than a predetermined change amount. Furthermore, the foreign substance determining process is performed again also when a variation amount of the value Q1 of the position signal from the potentiometer 108 after the movable lens is stopped becomes equal to or smaller than a predetermined variation amount, that is, when the position signal can be regarded as being stable. The selector 120 acquires the value Q1 at every repetition of step S1212 and calculates the change amount or the variation amount from a difference between a previously acquired Q1 and a currently acquired Q1. Moreover, the foreign substance determining process may be performed again when a predetermined time elapses after the variation amount of the value Q1 of the position signal from the potentiometer 108 becomes equal to or smaller than the predetermined variation amount.

This embodiment determines that, when the difference between the absolute position signal produced by the absolute position calculator 106 and the position signal obtained from the output from the potentiometer 108 is larger than the predetermined value, the foreign substance exists on the optical scale 101. In this case, this embodiment outputs (selects), instead of the absolute position signal produced by the absolute position calculator 106, the position signal obtained from the output from the potentiometer 108. This embodiment thereby can prevent an erroneous absolute position from being output due to the influence of the foreign substance existing on the optical scale 101, that is, can avoid the erroneous position detection.

In other words, this embodiment selects, when a difference between the absolute position signal and the second position signal is larger than the predetermined value due to the influence of the smudge or dust, instead of the absolute position signal, the second signal as the signal indicating the position of the movable member. Accordingly, this embodiment can avoid the erroneous detection of the position of the movable member due to the influence of the smudge or dust on the optical scale.

Embodiment 4

Next, description will be made of an encoder as a position detection apparatus that is a fourth embodiment (Embodiment 4) of the present invention. The encoder of this embodiment includes, as well as Embodiment 1, a first position detector (a) being an optical position detector used with an optical scale provided with multiple periodic patterns whose periods are mutually different and (b) configured to receive lights from the multiple periodic patterns when moving relatively to the optical scale with a movement of a movable member to generate multiple first detection signals respectively changing at periods corresponding to the periods of the multiple periodic patterns; a second position detector being a non-optical position detector and configured to generate a second detection signal changing with the movement of the movable member; and a calculator configured to (a) produce a first position signal by using the multiple first detection signals, (b) produce a second position signal whose resolution is different from that of the first position signal, by using the second detection signal, and (c) perform a calculation for combining the first position signal with the second position signal to produce a signal showing an absolute position of the movable member. The encoder of this embodiment further includes a selector configured to select, as a signal indicating a position of the movable member, the absolute position signal when a noise component included in the first position signal is smaller than a predetermined amount and to select, as the signal indicating the position of the movable member, the second position signal when the noise component is larger than the predetermined amount.

Figure 21:
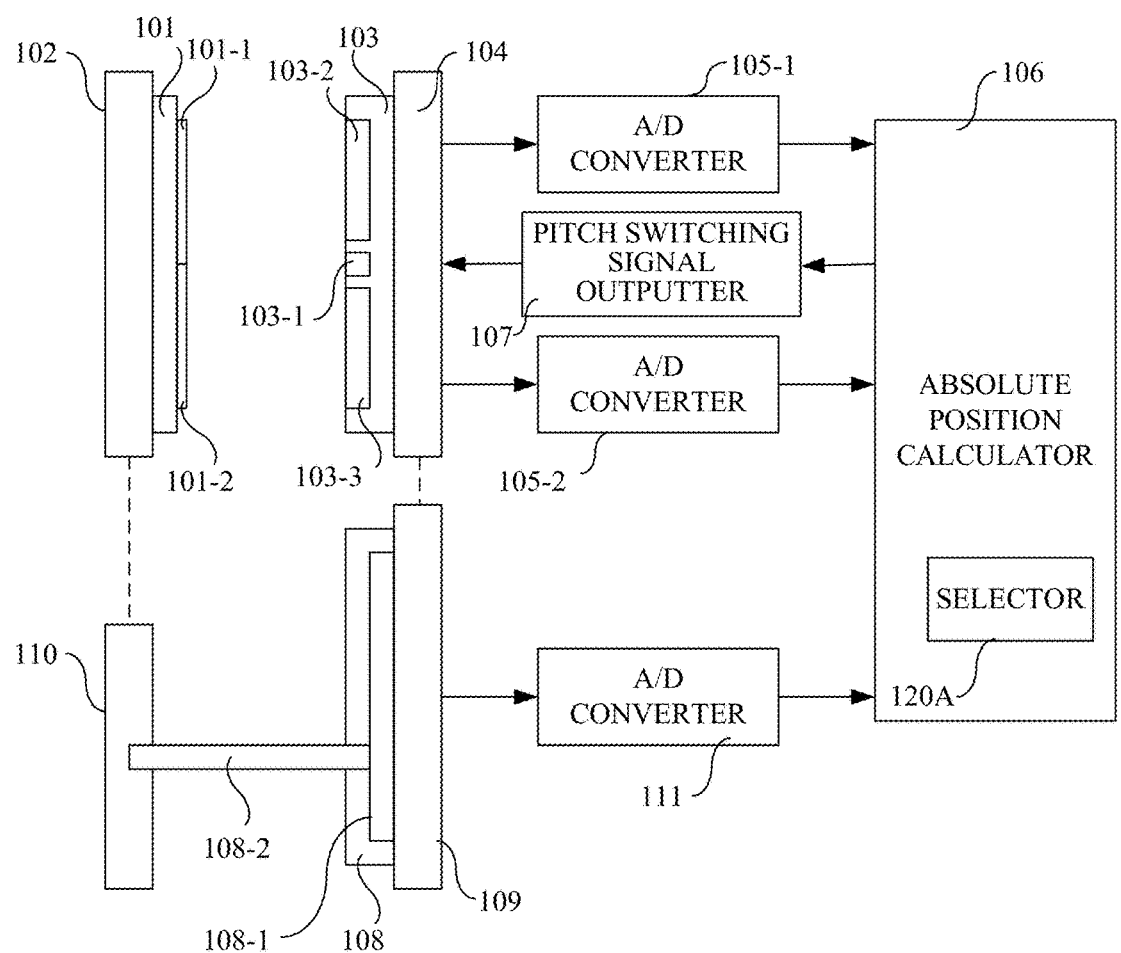
FIG. 21 is a block diagram illustrating a configuration of an encoder that is Embodiment 4 of the present invention.

FIG. 21 illustrates a configuration of the encoder of Embodiment 4. In FIG. 21, components identical to those described in Embodiment 1 (illustrated in FIG. 1) are denoted by the same reference numerals as those in Embodiment 1. In the encoder of this embodiment, the absolute position calculator 106 also performs the normalization process illustrated in FIG. 9 in Embodiment 1 and the absolute position calculation process illustrated in FIG. 10 in Embodiment 1.

(Foreign Substance Determining Process on Optical Scale and Erroneous Position Detection Avoiding Process)

The configuration and process described in Embodiment 1 enables avoiding the influence of the smudge and dust on the upper level signal. However, it is also necessary to avoid such an influence of the smudge and dust (hereinafter referred to collectively as "a foreign substance") on the optical scale 101 for the middle, lower and lowest level signals (first signals) produced from the output signals from the optical sensor 103. In the following, description will be made of a configuration and a process (foreign substance determining process) for determining an existence of the foreign substance on the optical scale 101 and a process (erroneous position detection avoiding process) for avoiding erroneous position detection due to the foreign substance.

In FIG. 21, reference numeral 120A denotes a selector provided in the absolute position calculator 106. The selector 120A performs the foreign substance determining process and selects, depending on a result of the foreign substance determining process, whether to output the absolute position signal produced by the absolute position calculator 106 or the position signal that is the output signal from the potentiometer 108 (A/D converter 111). The selector 120A may be provided separately from the absolute position calculator 106. In this case, the selector 120A has to perform a process for normalizing the position signal from the potentiometer 108 with respect to the output and scale ranges of the optical sensor 103.

Description will be made of the foreign substance determining process performed by the selector 120A with referring to a flowchart of FIG. 22. The selector 120A performs this process according to a computer program. The following description will be made of a case where the encoder is used for detecting a position of a movable lens in an image capturing apparatus later described in Embodiment 5. The movable member 102 (110) is moved integrally or in conjunction with the movable lens.

As described above, the absolute position calculator 106 produces the zone signal (intermediate signal) in order to perform the combining processes on the upper, middle, lower and lowest level signals and performs the combining processes after performing the discretizing process on the zone signal. In order to perform the discretizing process correctly, it is necessary that the zone signal have a level equal to or lower than $\pm 180°$. The foreign substance existing on the optical scale 101 deteriorates (increases) the level of the zone signal.

Thus, in this embodiment, the selector 120A performs a determination (foreign substance determining process) whether or not the foreign substance exists on the optical scale 101 by detecting the level of the zone signal before the discretizing process.

Specifically, the selector 120A determines whether or not Zone(Pot) calculated at step S1014 in FIG. 10, Zone($\theta$2-2') calculated at step S1013 and Zone($\theta$1) calculated at step S1012 each have a level enabling performing the discretizing process correctly. The level enabling performing the discretizing process correctly is $\pm 180°$ or less as described above. However, this embodiment sets a threshold range (predetermined range) for the determination to $\pm 100°$ or less, with a consideration that the influence of the foreign substance on the optical scale 101 is approximately $\pm 130°$ or less and a consideration of a margin for environmental change and an influence of noise. This threshold range is an example, and the threshold range may be adequately set depending on a degree of the influence of the foreign substance.

The zone signal within the threshold range shows that the noise components included in the middle, lower and lowest level signals used for producing the zone signal do not each have a magnitude causing the zone signal to exceed the threshold range (that is, a magnitude larger than a predetermined magnitude). Thus, the determination whether or not the zone signal is within the threshold range is equivalent to a determination whether the noise component included in each of the middle, lower and lowest level signals is smaller (or equal to) or larger than the predetermined magnitude.

Figure 22:
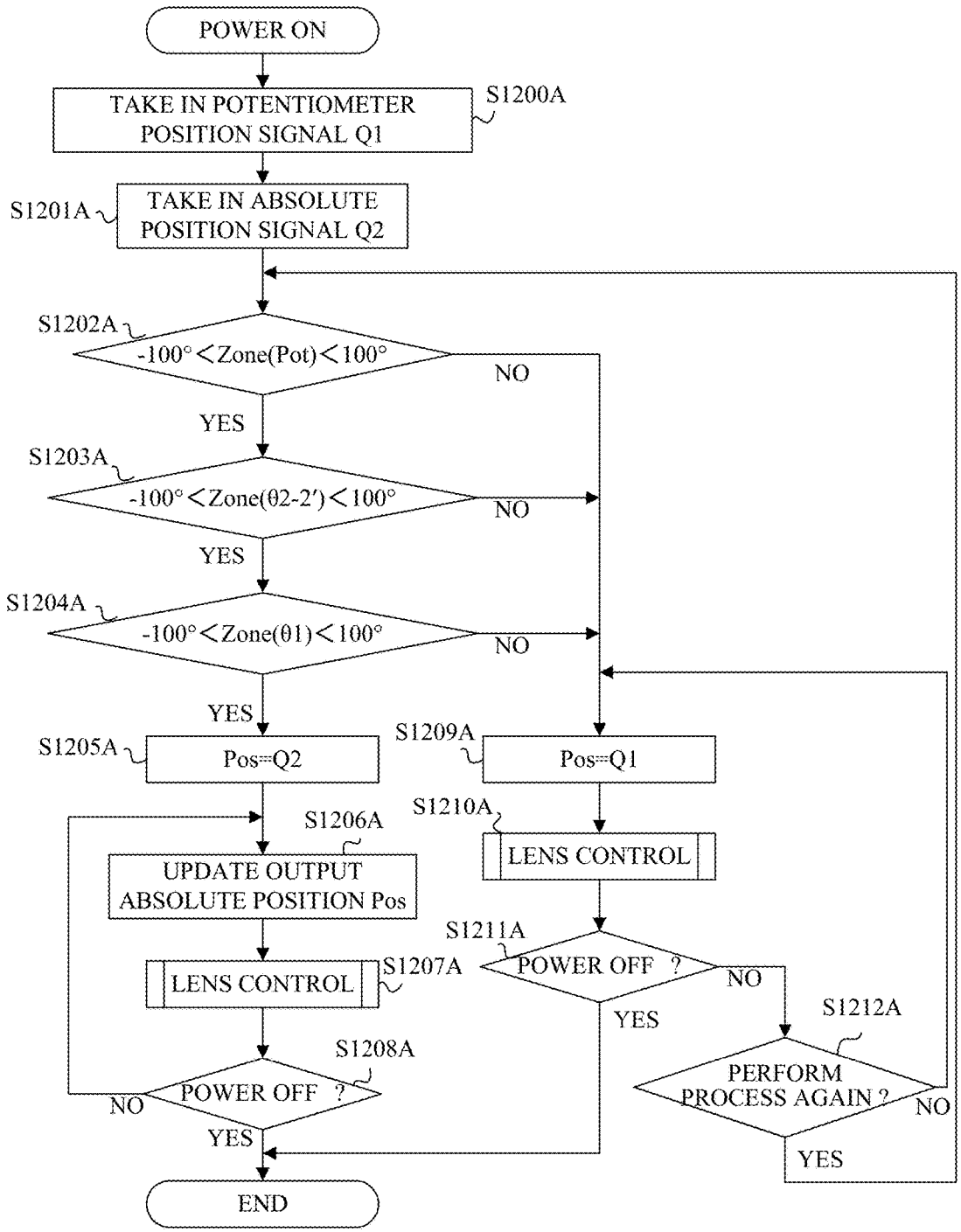
FIG. 22 illustrates a flowchart of a foreign substance determining process and an erroneous position detection avoiding process in Embodiment 4.

In FIG. 22, in response to power-on of the image capturing apparatus, the selector 120A takes in at step S1200A a value Q1 of the position signal (second position signal) Pot from the potentiometer 108. The position signal Pot corresponds to the above-described normalized upper level signal.

Next, at step S1201A, the selector 120A takes in a value Q2 of the absolute position signal Abs-(Pot) produced by the absolute position calculator 106.

Next, at steps S1202A, S1203A and S1204A, the selector 120A determines whether or not the zone signals, that is, Zone(Pot), Zone(θ2-2') and Zone(θ1) are within the threshold range of ±100°, respectively. If all the zone signals are within the threshold range of ±100°, the selector 120A proceeds to step S1205A.

At step S1205A, the selector 120A sets the value Q2 of the absolute position signal taken in from the absolute position calculator 106 at step S1201A, to the absolute position Pos. Furthermore, the selector 120A takes in the lowest level signal θ2 from the absolute position calculator 106 and then proceeds to step S1206A.

At step S1206A, the selector 120A increments or decrements the absolute position Pos depending on a change of the lowest level signal θ2 and its direction (plus or minus direction) to update an absolute position Pos to be output.

Next, at step S1207A, the selector 120A outputs the absolute position Pos to a camera microcomputer provided in the image capturing apparatus. The camera microcomputer performs various lens control processes by using the position Pos. The lens control processes include a zoom tracking process for moving a focus lens when the movable lens is a magnification-varying lens, an autofocus process for controlling a position of the focus lens when the movable lens is the focus lens, and others.

Next, at step S1208A, the selector 120 determines whether or not the power of the image capturing apparatus is turned off. If the power of the image capturing apparatus is not turned off, the selector 120A repeats the processes at steps S1206A and S1207A. If the power of the image capturing apparatus is turned off, the selector 120A ends this process.

On the other hand, the selector 120A having determined at step S1202A, S1203A or S1204A that any one (or more) of Zone(Pot), Zone(θ2-2') and Zone(θ1) exceeds the threshold range of ±100° proceeds to step S1209A.

At step S1209A, the selector 120A outputs, as the erroneous position detection avoiding process, the value Q1 of the position signal from the potentiometer 108 taken in at step S1200A, as the absolute position Pos of the movable member 102.

Next, at step S1210A, the selector 120A outputs the absolute position Pos to the above-described camera microcomputer. The camera microcomputer performs the various lens control processes by using the position Pos as described at step S1207A.

Then, at step S1211A, the selector 120A determines whether or not the power of the image capturing apparatus is turned off. If the power of the image capturing apparatus is not turned off, the selector 120A proceeds to steps S1212A. If the power of the image capturing apparatus is turned off, the selector 120A ends this process.

At step S1212A, the selector 120A determines whether or not to perform the foreign substance determining process again. The foreign substance determining process is performed again when the movable lens or the movable member 102 (110) is moved and thereby the value Q1 of the position signal from the potentiometer 108 is changed by a change amount equal to larger than a predetermined change amount. Furthermore, the foreign substance determining process is performed again also when a variation amount of the value Q1 of the position signal from the potentiometer 108 after the movable lens is stopped becomes equal to or smaller than a predetermined variation amount, that is, when the position signal can be regarded as being stable. The selector 120A acquires the value Q1 at every repetition of step S1212A and calculates the change amount or the variation amount from a difference between a previously acquired Q1 and a currently acquired Q1. Moreover, the foreign substance determining process may be performed again when a predetermined time elapses after the variation amount of the value Q1 of the position signal from the potentiometer 108 becomes equal to or smaller than the predetermined variation amount.

This embodiment selects, when the noise component of the first signal is larger than the predetermined value due to the influence of the smudge or dust on the optical scale, instead of the absolute position signal, the second signal as the signal indicating the position of the movable member. Accordingly, this embodiment can avoid the erroneous detection of the position of the movable member due to the influence of the smudge or dust on the optical scale.

Embodiment 5

Figure 23:
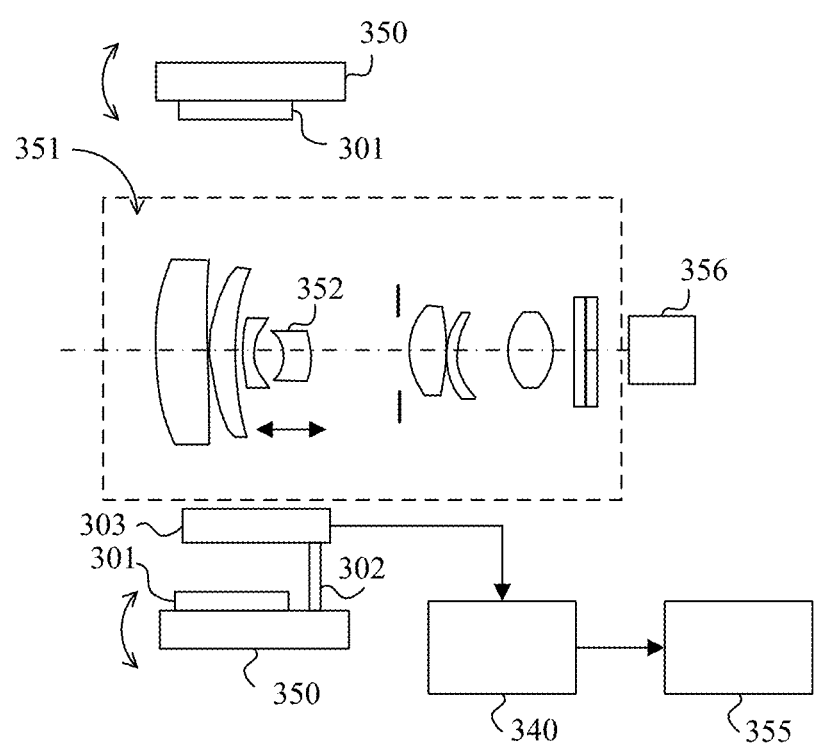
FIG. 23 illustrates a configuration of an image capturing apparatus that is Embodiment 5 of the present invention.

FIG. 23 illustrates, as an example of an apparatus provided with the encoder described in any one of Embodiments 1 to 4, an image capturing apparatus (optical apparatus) such as a digital still camera or a video camera. This image capturing apparatus uses the encoder for detecting an absolute position of a movable lens in a lens barrel.

In FIG. 23, reference numeral 301 denotes the optical scale 101 described in each embodiment. Reference numeral 302 denotes the slider 108-2 of the potentiometer 108 described in each embodiment. Reference numeral 303 denotes a block including the optical sensor 103 and the resister 108-1 of the potentiometer 108 described in each embodiment. Reference numeral 304 denotes a block including the A/D converters 105-1, 105-2 and 111, the pitch switching signal outputter 107 and the absolute position calculator 106. These components constitute the encoder of each embodiment.

The optical scale 301 and the slider 302 are fixed to an inner circumferential surface of a cylindrical cam ring 350 rotatable about an optical axis of an image capturing optical system 351. The cam ring 350 is rotationally driven by an actuator (not illustrated).

The lens barrel houses therein the image capturing optical system 351. The image capturing optical system 351 includes a movable lens (such as a magnification-varying lens or a focus lens) 352 movable in an optical axis direction by a cam formed in the rotatable cam ring 350.

Reference numeral 355 denotes a CPU as a camera microcomputer that controls the entire system of the image capturing apparatus. Reference numeral 356 denotes an image sensor (image pickup element) photoelectrically converting an object image formed by the image capturing optical system 351. The image sensor 356 is constituted by a photoelectric converter such as a CCD sensor or a CMOS sensor.

When the cam ring 350 is rotated to move the movable lens 352, the encoder detects an absolute rotation position of the cam ring 350 (that is, an absolute position of the movable lens 352 in the optical axis direction) and outputs information on the absolute rotation position to the CPU 355.

The CPU 355 drives the actuator to rotate the cam ring 350 on a basis of the information on the absolute rotation position to move the movable lens 352 to a target position.

The encoder described in each embodiment can be used in not only the above-described image capturing apparatus, but also various apparatuses such as a printer (optical apparatus) detecting its print head or its sheet supplying roller, a copier detecting a rotation position of its photosensitive drum, and a robot detecting a position of its arm. In these apparatuses, detecting an absolute position of the above-mentioned movable member by the encoder of each embodiment enables performing a highly accurate position control of the movable member, a good process using the detected absolute position and others.

Embodiment 6

Next, description will be made of a lens apparatus including a focus controlling apparatus that is a sixth embodiment (Embodiment 6) of the present invention. The focus controlling apparatus in this embodiment is configured to control a position of a focus element when a magnification-varying lens is moved via a movable member. The focus controlling apparatus includes a memory configured to store first data and second data each being data on positions of the focus element with respect to the magnification-varying lens and respectively being provided for a first magnification-variation direction and a second magnification-variation direction, the first and second magnification-variation directions corresponding to mutually difference movement directions of the magnification-varying lens; and a controller configured to control the position of the focus element by using a first detected position of the movable member detected by a first position detector and using specific data that is one of the first data and the second data. The controller is configured to select the specific data, when a difference between second detected positions detected in the first and second magnification-variation directions by a second position detector different from the first position detector is different from a difference between the first detected positions detected in the first and second magnification-variation directions by the first position detector, depending on a relation between the first detected position and the second detected position.

Figure 24:
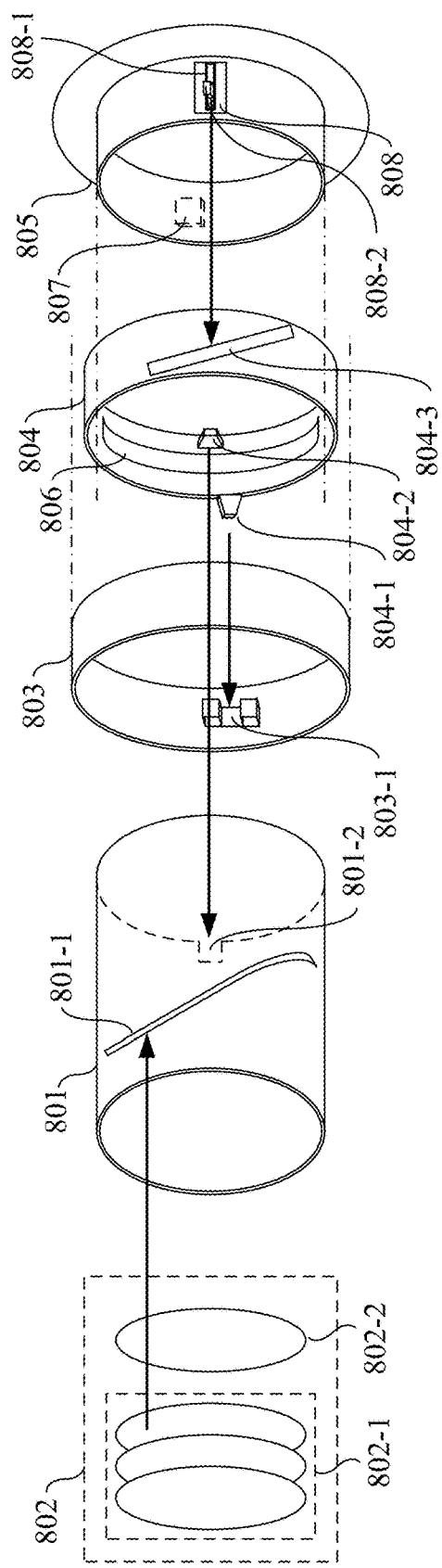
FIG. 24 is a block diagram illustrating a configuration of a lens unit that is Embodiment 6 of the present invention.

FIG. 24 illustrates a configuration of a lens unit as the lens apparatus of Embodiment 6. The lens unit is used for optical apparatuses such as an image capturing apparatus (for example, a video camera) and an interchangeable lens. Reference numeral 802 denotes an image capturing optical system including a magnification-varying lens 802-1 and a focus lens (focus element) 802-2.

Reference numeral 801 denotes a cam ring rotatable about an optical axis of the image capturing optical system 802. The cam ring 801 has, in its circumferential wall, a magnification-varying cam groove portion 801-1. The magnification-varying lens 802-1 is held by a zoom lens holding member (not illustrated). The zoom lens holding member is provided with a cam follower engaging with the magnification-varying cam groove portion 801-1. Therefore, a rotation of the cam ring 801 moves the magnification-varying lens 802-1 with the cam follower by a lift of the magnification-varying cam groove portion 801-1 in a direction (optical axis direction) along the optical axis to perform variation of magnification (zoom).

The focus lens 802-2 is held by a focus lens holding member (not illustrated). The focus lens holding member is supported movably in the optical axis direction by guide bars (not illustrated). A movement of the focus lens 802-2 in the optical axis direction performs a correction of an image plane variation caused by the movement of the magnification-varying lens 802-1 and focusing.

Reference numeral 803 denotes a manual zoom operation ring as an operation member rotatable about the optical axis by a rotation operation by a user. Reference numeral 804 denotes a drive ring as a movable member rotatable about the optical axis. The drive ring 804 is disposed between an inner circumferential surface of the manual zoom operation ring 803 and an outer circumferential surface of a drive base 805 as a base member.

The drive ring 804 is provided with a ring coupling key 804-1 and a cam coupling key 804-2. The ring coupling key 804-1 as an engagement portion engages with a ring coupling portion 803-1 as another engagement portion provided in the manual zoom operation ring 803 in a rotation direction of the drive ring 804 and the manual zoom operation ring 803.

The cam coupling key 804-2 as still another engagement portion engages with a cam coupling portion 801-2 as further another engagement portion provided in the cam ring 801 in a rotation direction of the drive ring 804 and the cam ring 801. The drive ring 804 is rotatably supported by the drive base 805 via guide rollers (not illustrated) at a fixed position in the optical axis direction.

A rotation of the manual zoom operation ring 803 is transmitted through the ring coupling portion 803-1 and the ring coupling key 804-1 engaging therewith to the drive ring 804, thereby causing the drive ring 804 to rotate with respect to the drive base 805. The rotation of the drive ring 804 is transmitted through the cam coupling key 804-2 and the cam coupling portion 801-2 engaging therewith to the cam ring 801, thereby causing the cam ring 804 to rotate with respect to the drive base 805. Thereby, the magnification-varying lens 802-1 is moved in the optical axis direction as described above.

An optical scale 806 is fixed to an inner circumferential surface of the drive ring 804 so as to extend in a circumferential direction of the drive ring 804. On the other hand, an optical sensor unit (first position detector as an optical position detector; hereinafter referred to simply as "an optical sensor") 807 is fixed to the outer circumferential surface of the drive base 805 so as to face the optical scale 806. The optical sensor 807 receives, when the optical scale 806 is rotated with respect to the optical sensor 807 with the integral rotation (movement) of the manual zoom operation ring 803 and the drive ring 804, light from periodic patterns provided to the optical scale 806. The optical sensor 807 thereby outputs a detection signal (first detection signal) corresponding to a rotation position of the drive ring 804 and the manual zoom operation ring 803. The optical sensor 807 and the optical scale 806 constitute an encoder.

Furthermore, a potentiometer (second position detector as a non-optical position detector) 808 is fixed to the outer circumferential surface of the drive base 805. The potentiometer 805 is a variable resister. On the other hand, a potentiometer cam groove portion (cam portion) 804-3 is formed in a circumferential wall of the drive ring 804. A slider (movable portion) 808-2 is slidable in the optical axis direction in contact with a resister 808-1 as a scale of the potentiometer 808 and has a cam follower lever. This cam follower lever engages with the potentiometer cam groove portion 804-3. The rotation of the drive ring 804 with the manual zoom operation ring 803 causes, via the cam follower lever, the slider 808-2 to slide with respect to the resister 808-1, which changes an electric resistance value of the potentiometer 808. The potentiometer 808 thereby outputs a detection signal (second detection signal) corresponding to the rotation position of the drive ring 804 and the manual zoom operation ring 803.

The detection signal output from the optical sensor 807 and the detection signal output from the potentiometer 808 are used for detecting an absolute rotation position of the manual zoom operation ring 803, as described below, and used also for detecting (determining) a rotation direction of the drive ring 804 and the manual zoom operation ring 803.

Although this embodiment describes the case where the optical sensor 807 and the potentiometer 808 detect the rotation position and direction of the drive ring 804 as the movable member, a configuration may be employed which detects the rotation position and direction of the manual zoom operation ring 803 as another movable member. Furthermore, although this embodiment describes the case where the optical scale 806 is provided to the drive ring 804 that is the movable member and the optical sensor 807 is provided to the drive base 805 that is the base member, a configuration may be employed in which the optical sensor 807 is provided to the drive ring 804 and the optical scale 806 is provided to the drive base 805. That is, it is only necessary that the optical scale 806 and the optical sensor 807 be relatively rotatable (relatively movable) with respect to each other. Moreover, a configuration may be employed in which the potentiometer 808 is provided to the drive ring 804 and the potentiometer cam groove portion is provided to the drive base 805.

Figure 25:
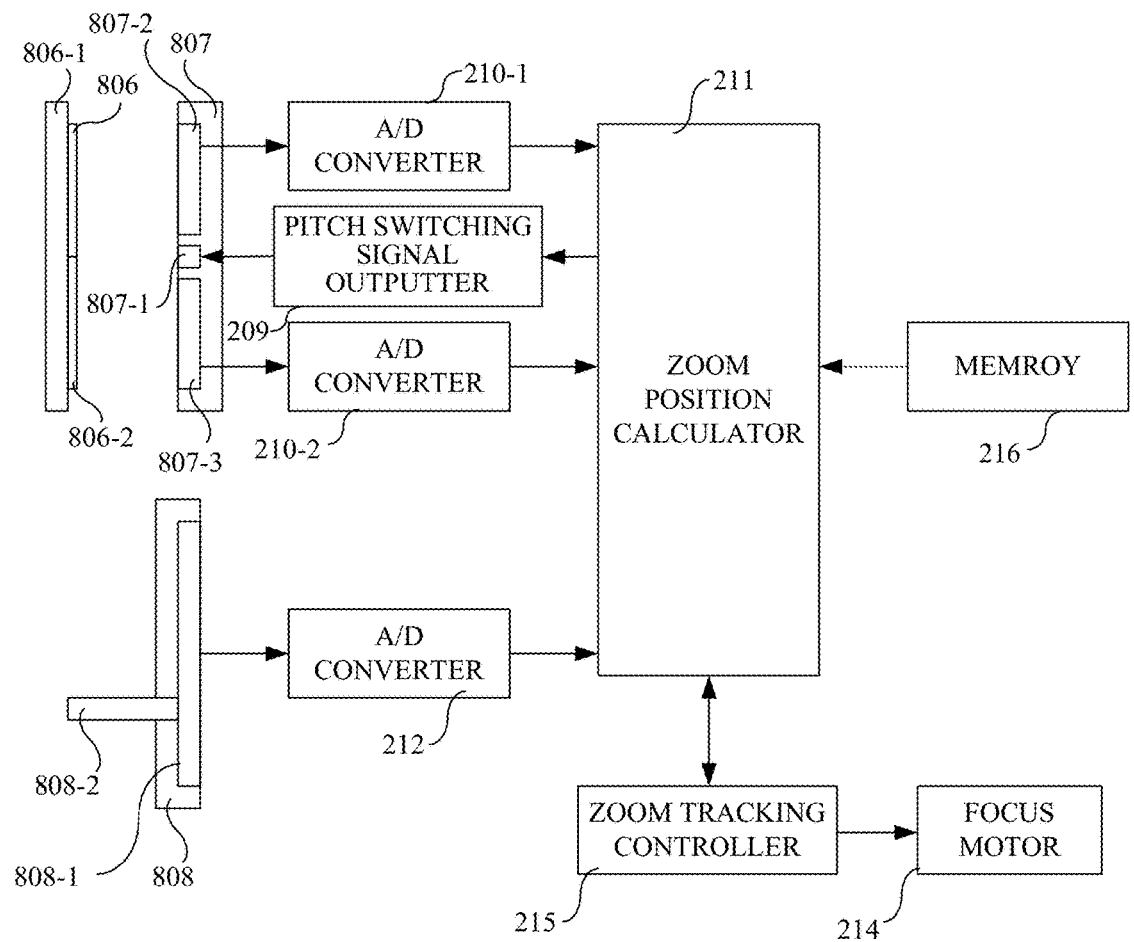
FIG. 25 is a block diagram illustrating a configuration for position detection of a zoom lens in the lens unit in Embodiment 6.

FIG. 25 illustrates a configuration of the encoder as the position detection apparatus of this embodiment. As described above, the optical scale 806 is fixed to the drive ring 804 rotatable (movable) with respect to the drive base 805. The optical scale 806 is provided with a first scale track 806-1 and a second scale track 806-2 similar to the first scale track 101-1 and the second scale track 101-2 illustrated in FIG. 2A in Embodiment 1.

The optical sensor 807 is fixed to the drive base 805 as described above. The optical sensor 807 is provided with a light emitter 807-1 including an LED as a light source, a first light receiver 807-2 and a second light receiver 807-3. The first and second light receivers 807-2 and 807-3 each include multiple light-receiving elements arranged in a direction in which the optical scale 806 is movable, that is, in a relative movement direction of the optical scale 806 and the optical sensor 807. The relative movement direction is hereinafter referred to as "a position detection direction".

The optical sensor 807 is disposed so as to face the optical scale 806. Light as a divergent light flux emitted from the light emitter 807-1 in the optical sensor 807 is projected to the first scale track 806-1 and the second scale track 806-2 on the optical scale 806. Light reflected by multiple periodic patterns (two periodic patterns 201-1 and 201-2 illustrated in FIG. 2A) provided in the first scale track 806-1 proceeds toward the first light receiver 807-2 to form thereon two optical images (hereinafter referred to also as "pattern images") of the periodic patterns 201-1 and 201-2 in the first scale track 806-1.

On the other hand, light reflected by multiple periodic patterns (two periodic patterns 202-1 and 202-2 illustrated in FIG. 2A) provided in the second scale track 806-2 proceeds toward the second light receiver 807-3 to form thereon two optical images (pattern images) of the periodic patterns 202-1 and 202-2 in the second scale track 806-2. Each periodic pattern is constituted by reflective portions each reflecting light and non-reflective portions each not reflecting light; the reflective and non-reflective portions are alternately arranged in the position detection direction.

The first light receiver 807-2 photoelectrically converts the two received patterns images (that is, reads the periodic patterns 201-1 and 201-2) to output two detection signals corresponding to the two pattern images. Similarly, the second light receiver 807-3 photoelectrically converts the two received patterns images (that is, reads the periodic patterns 202-1 and 202-2) to output two detection signals corresponding to the two pattern images. When the optical scale 806 is moved with the drive ring 804 with respect to the optical sensor 807, each detection signal becomes a signal (hereinafter referred to as "a periodic signal") changing at a period corresponding to a period of the corresponding periodic pattern.

Each of the periodic signals output from the first light receiver 807-2 is converted into a digital signal by an A/D converter 210-1, and the digital signal is input to a zoom position calculator 211. Each of the periodic signals output from the second light receiver 807-3 is converted into a digital signal by an A/D converter 210-2, and the digital signal is input to the zoom position calculator 211.

The zoom position calculator 211 as a calculator calculates, by using the digital signals input from the A/D converters 210-1 and 210-2, an absolute position (first detected position) of the drive ring 804 (and the manual zoom operation ring 803) in its rotation direction.

A pitch switching signal outputter 212 outputs, to the optical sensor 807, a pitch switching signal for switching a light-receiving pitch (detection pitch) of the multiple light-receiving elements provided to each of the first and second light receivers 807-2 and 807-3. The optical sensor 807 switches, in response to input of the pitch switching signal, the light-receiving pitch between a first light-receiving pitch corresponding to pitches of the periodic patterns 201-1 and 202-1 each having a long period and a second light-receiving pitch corresponding to pitches of the periodic patterns 201-2 and 202-2 each having a short period. Thereby, as well as the encoder described in Embodiment 1, the switching of the light-receiving pitch enables each of the first and second light-receivers 807-2 and 807-3 to read the two periodic patterns. Signals produced by the reading of these periodic patterns are the same as those described using FIGS. 2A to 2C in Embodiment 1.

Figure 26:
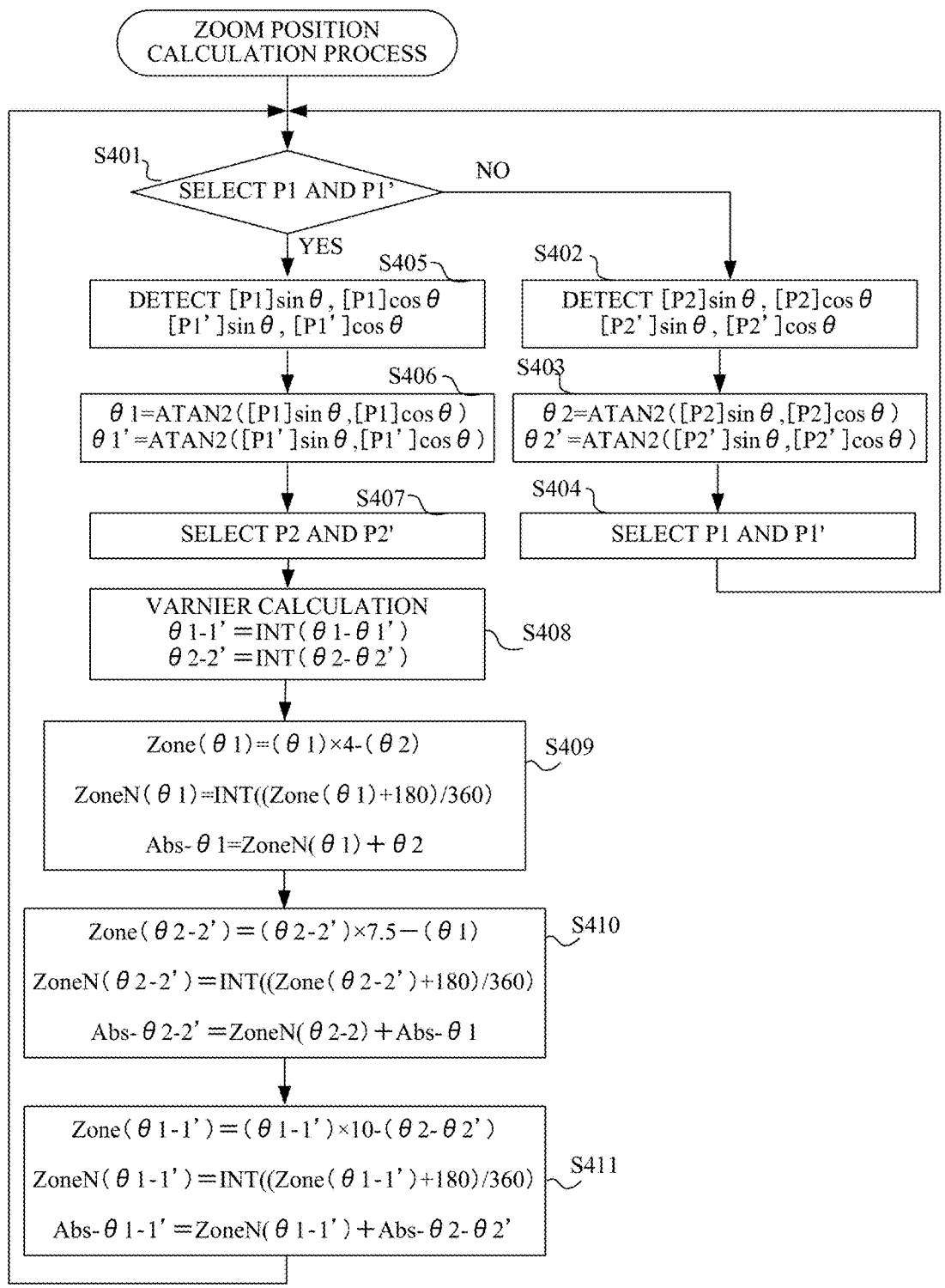
FIG. 26 illustrates a flowchart of a zoom absolute position calculation process in Embodiment 6.

FIG. 26 illustrates a flowchart of an absolute position calculation process performed by the zoom position calculator 211. In the following description, as an example, the optical scale 806 has a length (scale length) of 40 mm in the position detection direction, and pattern numbers (numbers of the reflective portions) of the periodic patterns 201-1, 201-2, 202-1 and 202-2 on the optical scale 806 are respectively 75, 300, 74 and 290. The periodic signals corresponding to the periodic patterns 201-1, 201-2, 202-1 and 202-2 are hereinafter referred to respectively as "P1", "P2", "P1'" and "P2'".

The zoom position calculator 211 having detected at step S401 that the light-receiving pitch corresponding to P2 and P2' is selected by the pitch switching signal outputter 212 proceeds to step S402. At step S402, the zoom position calculator 211 detects signals sampled by the A/D converters 210-1 and 210-2 as P2 and P2'.

Next, at step S403, the zoom position calculator 211 performs an arctangent conversion process on P2 and P2' to produce signals θ2 and θ2'. When sin θ waves and cosine waves of P2 and P2' are expressed as:

[P2] sin θ and [P2] cos θ; and

[P2'] sin θ and [P2'] cos θ, the signals θ2 and θ2' as results of the arctangent conversion process on P2 and P2' are expressed by following expressions (41) and (42).

$$\theta 2 = A\ TAN\ 2([P2]\sin\theta, [P2]\cos\theta) \quad (41)$$

$$\theta 2' = A\ TAN\ 2([P2']\sin\theta, [P2']\cos\theta) \quad (42)$$

After this arctangent conversion process, at step S404, the zoom position calculator 211 outputs a command for selection of the light-receiving pitch corresponding to P1 and P1' to the pitch switching signal outputter 212. Then, the zoom position calculator 211 returns to step S401.

The zoom position calculator 211 having detected at step S401 that the light-receiving pitch corresponding to P1 and P1' is selected by the pitch switching signal outputter 212 proceeds to step S405. At step S405, the zoom position calculator 211 detects signals sampled by the A/D converters 210-1 and 210-2 as P1 and P1'.

Next, at step S406, the zoom position calculator 211 performs the arctangent conversion process on P1 and P1' to produce signals θ1 and θ1'. When sine waves and cosine waves of P1 and P1' are expressed as:

[P1] sin θ and [P1] cos θ; and

[P1'] sin θ and [P1'] cos θ, the signals θ1 and θ1' as results of the arctangent conversion process on P1 and P1' are expressed by following expressions (43) and (44).

$$\theta 1 = A\ TAN\ 2([P1]\sin\theta, [P1]\cos\theta) \quad (43)$$

$$\theta 1' = A\ TAN\ 2([P1']\sin\theta, [P1']\cos\theta) \quad (44)$$

After this arctangent conversion process, at step S407, the zoom position calculator 211 outputs a command for selection of the light-receiving pitch corresponding to P2 and P2' to the pitch switching signal outputter 212. Then, the zoom position calculator 211 proceeds to step S408.

At step S408, the zoom position calculator 211 performs a vernier calculation process (hereinafter referred to simply as "a vernier calculation") on the signals θ1 and θ1' to produce an upper level signal used for calculating an absolute position. Furthermore, the zoom position calculator 211 performs another vernier calculation on the signals θ2 and θ2' to produce a middle level signal used for calculating the absolute position. Thereafter, the zoom position calculator 211 proceeds to step S409.

A method of performing the vernier calculation on the signals θ1 and θ1' and on the signals θ2 and θ2' to produce a vernier signal θ1-1' as the upper level signal and a vernier signal θ2-2' as the middle level signal is the same as that described in Embodiment 1 using FIG. 4.

The zoom position calculator 211 calculates, by the above-described processes from steps S401 to S408, four kinds of signals for calculating the absolute position, that is, the upper level signal θ1-1', the middle level signal θ2-2', the signal θ1 as a lower level signal and the signal θ2 as a lowest level signal. The middle level signal θ2-2', the lower level signal θ1 and the lowest level signal θ2 correspond to a first position signal.

This embodiment also performs the absolute position calculation process described in Embodiment 1 using FIG. 6. At step S409, the zoom position calculator 211 combines the lowest level signal with the lower level signal by a combing process similar to that described using FIG. 6 in Embodiment 1. Next, at step S410, the zoom position calculator 211 combines the lower level signal with the middle level signal in a similar manner. Furthermore, at step S411, the zoom position calculator 211 combines the middle level signal with the upper level signal by the method described using FIG. 6 in Embodiment 1. These combining processes use, for example, numeral expressions (7) to (15) described at steps S309 to S311 in FIG. 3 in Embodiment 1. Thus, the combination of the lowest, lower, middle and upper level signals is completed to produce an absolute position signal Abs-(θ1-1') as a signal showing the absolute position.

Next, with referring to FIG. 25, description will be made of detection of the rotation position of the manual zoom operation ring 803 (and the drive ring 804) by using the potentiometer 808. As described using FIG. 24, the potentiometer 808 is constituted by the resister 808-1 as the resister and the slider 808-2 slidable in contact with the resister 808-1. The slider 808-2 is in contact with the resister 808-1 via a contact brush.

The slider 808-2 engages with the potentiometer cam groove portion 804-3 of the drive ring 804 via the cam follower lever. The slider 808-2 is thereby moved with respect to the resister 808-1 with the rotation of the drive ring 804. The electric resistance value of the potentiometer 808 is changed with the rotation of the drive ring 804, and a detection signal having a voltage value corresponding to the electric resistance value is output from the potentiometer 808. The detection signal as an analog signal output from the potentiometer 808 is converted by the A/D converter 210-3 into a digital signal, and the digital detection signal (potentiometer signal) is input to the zoom position calculator 211. The zoom position calculator 211 calculates, by using the input potentiometer signal, a potentiometer detected position as a second detected position of the drive ring 804.

The potentiometer detected position is normalized by the following calculation using the rotation position of the manual zoom operation ring 803 detected by using the detection signal from the encoder (actually, the rotation position of the drive ring 804 to which the optical scale 806 is provided). The rotation position (first detected position) detected by using the detection signal from the encoder is hereinafter referred to as "an encoder detected position".

When Enc(W) represents an encoder detected position Abs-(θ1-1') at a wide-angle end, Enc(T) represents an encoder detected position Abs-(θ1-1') at a telephoto end, Pot(W) represents a potentiometer detected position at the wide-angle end, Pot(T) represents a potentiometer detected position at the telephoto end, and the encoder detected position Enc(T) and potentiometer detected position Pot(T) coincide with each other, an normalization coefficient C is calculated by following expression (45).

$$C = [(Enc(T) - Enc(W))/(Pot(T) - Pot(W))] \quad (45)$$

A normalized potentiometer detected position is calculated by following expression (46) using a potentiometer detected position Pot(x) before the normalization.

$$\text{Normalized potentiometer detected position} = Enc(W) + Pot(x) \times C \quad (46)$$

In FIG. 25, reference numeral 214 denotes a focus motor as an actuator that moves the focus lens 802-2 in the optical axis direction. Reference numeral 215 denotes a zoom tracking controller that controls drive of the focus motor 214, that is, a position of the focus lens 802-2.

Reference numeral 216 denotes a memory (storage medium) storing cam data. The cam data is provided for each of object distances and indicates a position (hereinafter referred to as "an in-focus position") of the focus lens 808-2 at which an in-focus state for an identical object distance can be obtained for each of positions (zoom positions) of the magnification-varying lens 802-1.

The zoom tracking controller 215 performs a focus lens position control to move the focus lens 802-2 to the in-focus position by using the cam data such that an in-focus state can be maintained during the movement of the magnification-varying lens 802-1 by the rotation operation of the manual zoom operation ring 803 (hereinafter referred to as "a zoom operation"). This focus lens position control is called a zoom tracking control. The zoom tracking controller 215 and the memory 216 constitute a focus control apparatus.

As described above, the rotation of the manual zoom operation ring 803 is transmitted through the ring coupling portion 803-1 and the ring coupling key 804-1 engaging therewith to the drive ring 804. Furthermore, the rotation of the drive ring 804 is transmitted through the cam coupling key 804-2 and the cam coupling portion 801-2 engaging therewith to the cam ring 801. However, the ring coupling portion 803-1 and the ring coupling key 804-1 have an engagement backlash (hereinafter referred to as "a ring coupling backlash") therebetween in the rotation direction. Thus, even though the manual zoom operation ring 803 is rotated, the drive ring 804 to which the optical scale 806 of the encoder is provided is not rotated until the ring coupling backlash is reduced (eliminated).

Figure 27:
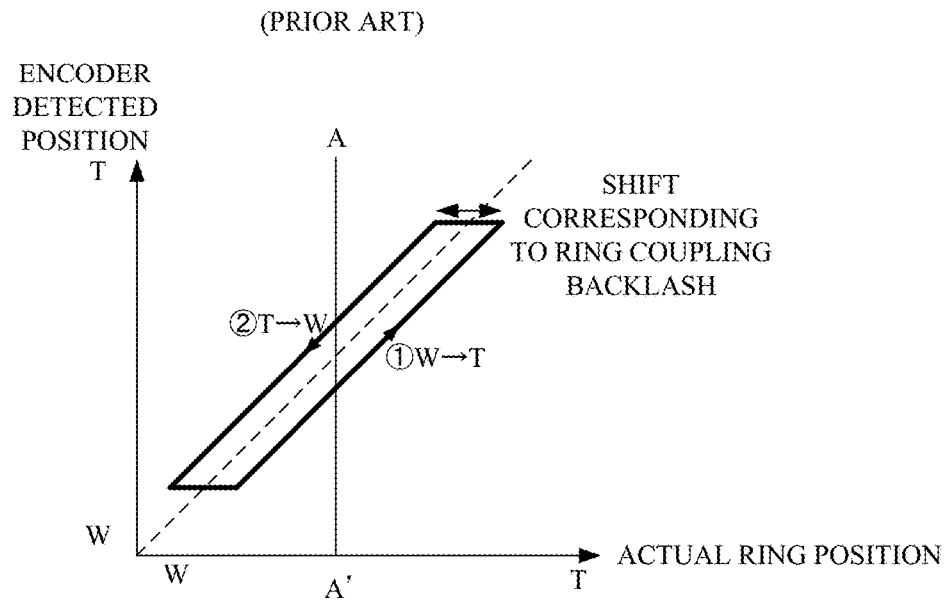
FIGS. 27 and 28 illustrate conventional problems.

FIG. 27 illustrates a relation between an actual rotation position of the manual zoom operation ring 803 (hereinafter referred to as "an actual ring position") and the encoder detected position of the drive ring 804; the encoder detected position is also the rotation position of the manual zoom operation ring 803 after the ring coupling backlash is reduced. In FIG. 27, a dashed line shows an ideal relation between the actual ring position and the encoder detected position when the manual zoom operation ring 803 and the drive ring 804 have no ring coupling backlash therebetween.

On the other hand, when the manual zoom operation ring 803 and the drive ring 804 have the ring coupling backlash therebetween, a relation between the actual ring position and the encoder detected position during a zoom from a wide-angle (W) side to a telephoto (T) side (hereinafter abbreviated as "a zoom W→T") is as illustrated by a line with circled 1, and a relation between the actual ring position and the encoder detected position during a zoom from the telephoto side to the wide-angle side (hereinafter abbreviated as "a zoom T→W") is as illustrated by a line with circled 2. A zoom direction in the zoom W→T corresponds to a first magnification-variation direction, and a zoom direction in the zoom T→W corresponds to a second magnification-variation direction.

At a position indicated by A-A', during the zoom W→T the encoder detected position shifts with respect to the actual ring position to the wide-angle side, and during the zoom T→W the encoder detected position shifts with respect to the actual ring position to the telephoto side. This is because, even though the zoom operation is performed, the drive ring 804 to which the optical scale 806 is provided is not rotated until the ring coupling backlash is reduced and thereby the encoder detected position also does not change, and the encoder detected position starts changing after the ring coupling backlash is reduced.

Furthermore, the cam coupling key 804-2 of the drive ring 804 and the cam coupling portion 801-2 of the cam ring 801 have an engagement backlash (hereinafter referred to as "a cam ring coupling backlash") therebetween in the rotation direction. Thus, even though the drive ring 804 is rotated, the came ring 801 is not rotated until the cam ring coupling backlash is reduced and thereby the magnification-varying lens 802-1 is also not moved. Moreover, the magnification-varying cam groove portion 801-1 of the cam ring 801 and the cam follower provided to the magnification-varying lens 802-1 also have an engagement backlash (hereinafter referred to as "a cam coupling backlash") therebetween, which retards the movement of the magnification-varying lens 802-1 from start of the rotation of the cam ring 801 until the cam coupling backlash is reduced.

As a result from these backlashes, the encoder detected position shifts with respect to an actual position of the magnification-varying lens 802-1 (hereinafter referred to as "an actual zoom lens position"). The shift of the encoder detected position with respect to the actual zoom lens position significantly affects the zoom tracking control.

Figure 28:
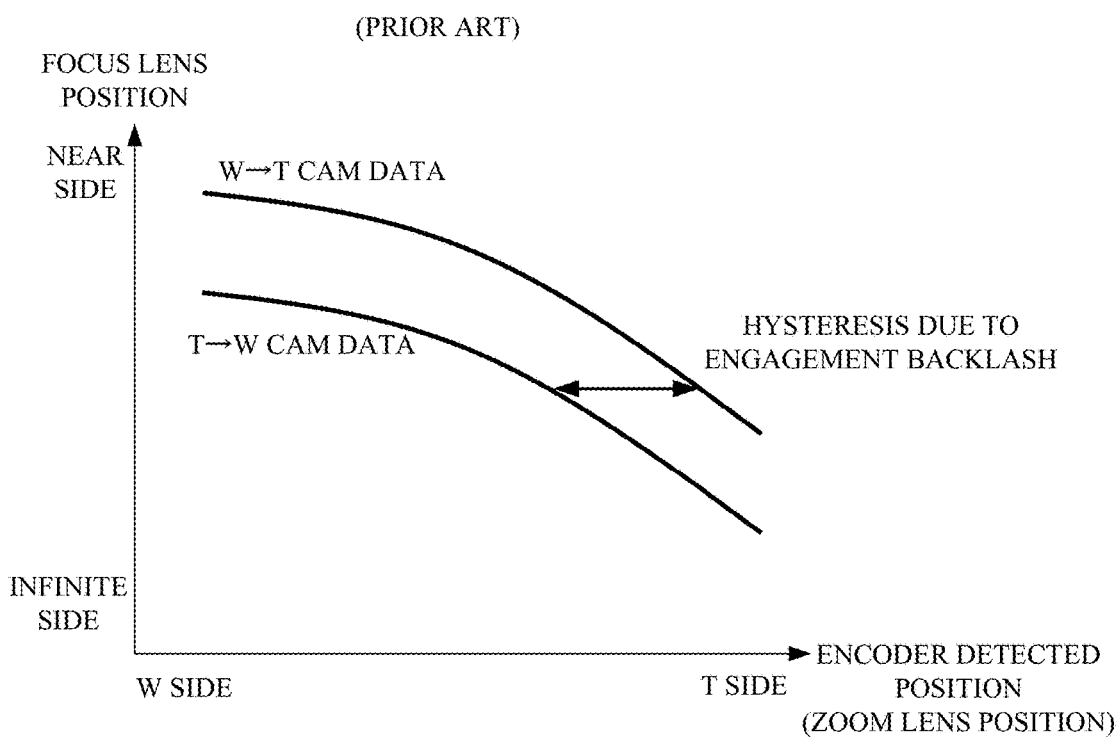

FIG. 28 illustrates two sets of cam data used for the zoom tracking control and provided for one certain object distance. In FIG. 28, a horizontal axis represents encoder detected positions. The encoder detected position in FIG. 28 is equivalent to the actual zoom lens position on the two sets of cam data. A vertical axis represents positions of the focus lens 802-2 (hereinafter each referred to as "a focus lens position").

Ideally, providing one set of cam data for one object distance enables performing the zoom tracking control using that one set of cam data, regardless of an operation direction of the manual zoom operation ring 803 (hereinafter referred to as "a zoom operation direction"). However, even though the encoder detected position is changed by the zoom operation, the magnification-varying lens 802-1 is not moved until the cam coupling backlash between the drive ring 804 and the cam ring 801 is reduced. Therefore, the encoder detected position shifts with respect to the actual zoom lens position.

Furthermore, such shift is generated in any zoom operation direction, that is, in both the zoom operation directions for W→T and T→W, so that two encoder detected positions exist on the telephoto side and the wide-angle side further than the actual zoom lens position. Accordingly, it is necessary to provide two separate sets of cam data for the respective zoom operation directions (that is, W→T cam data as first cam data and T→W cam data as second cam data) and select, depending on the zoom operation direction, the cam data used for the zoom tracking control.

However, in manual zoom described in this embodiment in which the rotation operation of the manual zoom operation ring 803 mechanically causes the magnification-varying lens 802-1 to move, even in a non-energized state of the optical sensor 807, that is, a power-off state of the optical apparatus, the magnification-varying lens 802-1 is moved by the zoom operation. In such a non-energized state, the encoder cannot detect the zoom operation direction. Thus, even when the power of the optical apparatus is turned on and thereby the optical sensor 807 is started to be energized, it is unknown in which zoom operation direction (wide-angle or telephoto side) the backlash is reduced at that point. Therefore, it is unclear which one of the W→T cam data and the T→W cam data should be selected. Moreover, even if the cam data corresponding to the zoom operation direction is selected, it is unclear whether to immediately move the focus lens 802-2 according to the cam data in response to the zoom operation or to stop moving the focus lens 802-2 until the backlash is reduced. That is, a good zoom tracking control cannot be performed.

Figure 29:
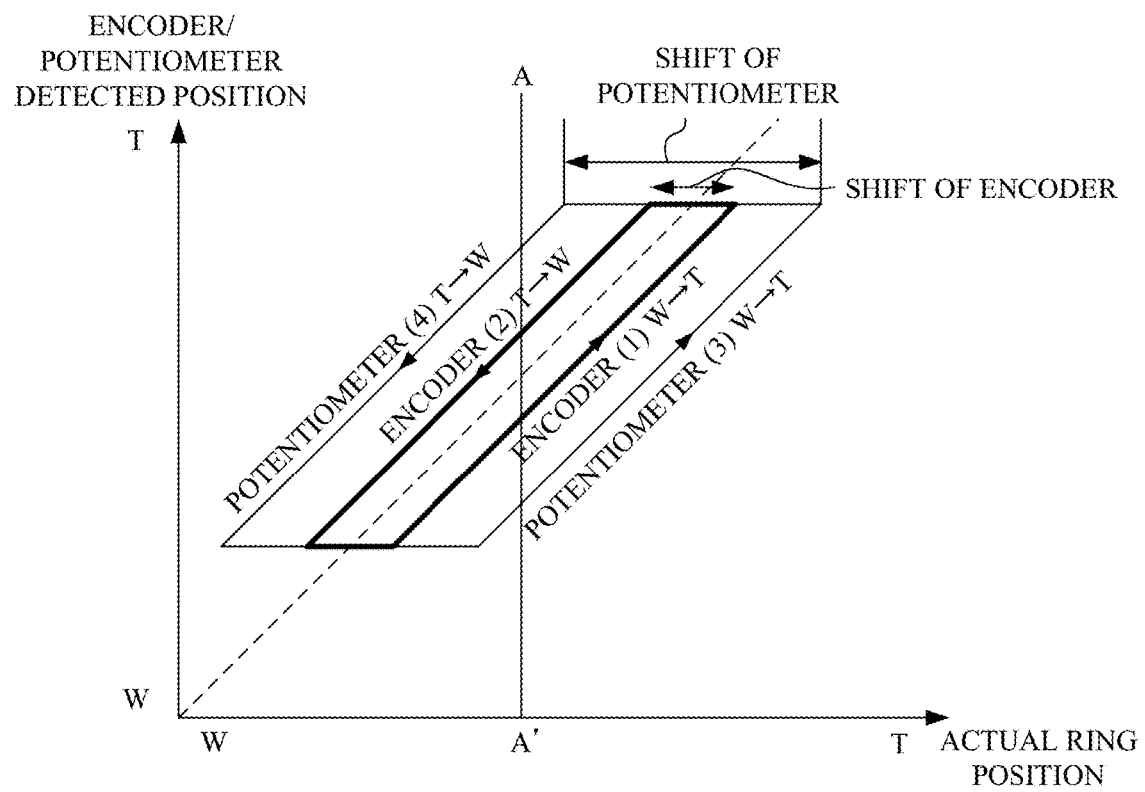
FIG. 29 illustrates an influence of a mechanism backlash on position detection results obtained by an encoder and a potentiometer in Embodiment 6.

FIG. 29 illustrates relations between the encoder and potentiometer detected positions and the actual ring position. The relation of the encoder detected position and the actual ring position is affected by the ring coupling backlash between the manual zoom operation ring 803 and the drive ring 804 and is expressed by a line with circled 1 and a line with circled 2 which are the same lines as those illustrated in FIG. 27.

On the other hand, the relation between the potentiometer detected position and the actual ring position is affected by, in addition to the ring coupling backlash, an engagement backlash between the potentiometer cam groove portion 804-3 of the drive ring 804 and the slider 808-2 (cam follower lever); this engagement backlash is hereinafter referred to as "a potentiometer drive backlash". Moreover, the relation between the potentiometer detected position and the actual ring position is affected by an engagement backlash existing a contact portion of the slider 808-2 and the resister 808-1 in the potentiometer 808 (hereinafter referred to as "an in-potentiometer backlash").

As just described, the engagement backlashes affecting the relation between the potentiometer detected position and the actual ring position are included in a greater number of portions than those including the engagement backlashes affecting the relation between the encoder detected position and the actual ring position. Thus, in both the zoom operation directions for W→T and T→W, the shift between the potentiometer detected position and the actual ring position is larger than that between encoder detected position and the actual ring position. The relation between the potentiometer detected position and the actual ring position is expressed in FIG. 29 by a line with circled 3 and a line with circled 4 in the respective zoom operation directions for W→T and T→W.

In the case illustrated in FIG. 29, at a position indicated by A-A', the zoom W→T generates a difference of the potentiometer detected position from the encoder detected position on the wide-angle side, and the zoom T→W generates a difference of the potentiometer detected position from the encoder detected position on the telephoto side. This is because, even though the zoom operation is performed, the encoder detected position starts changing before the engagement backlashes affecting the potentiometer 808 are reduced, and on the other hand the potentiometer detected position does not change and starts changing after these engagement backlashes are reduced.

When each detected position becomes "larger" as it becomes closer to the telephoto end from the wide-angle end, the potentiometer detected position and the encoder detected position have the following relation.

In zoom W→T: Encoder detected position>Potentiometer detected position

In zoom T→W: Potentiometer detected position>Encoder detected position

This relation enables determining, at power-on, the zoom operation direction in which the manual zoom operation ring 803 was operated (that is, the zoom direction) from a previous power-off to immediately before the power-on. When the manual zoom operation ring 803 is operated thereafter, a determination can be made whether the engagement backlash has already been reduced and thereby the magnification-varying lens 802-1 immediately moves or the engagement backlash has not been completely reduced and thereby the magnification-varying lens 802-1 does not move. That is, a determination of a backlash reduced state can be made.

Figure 30:
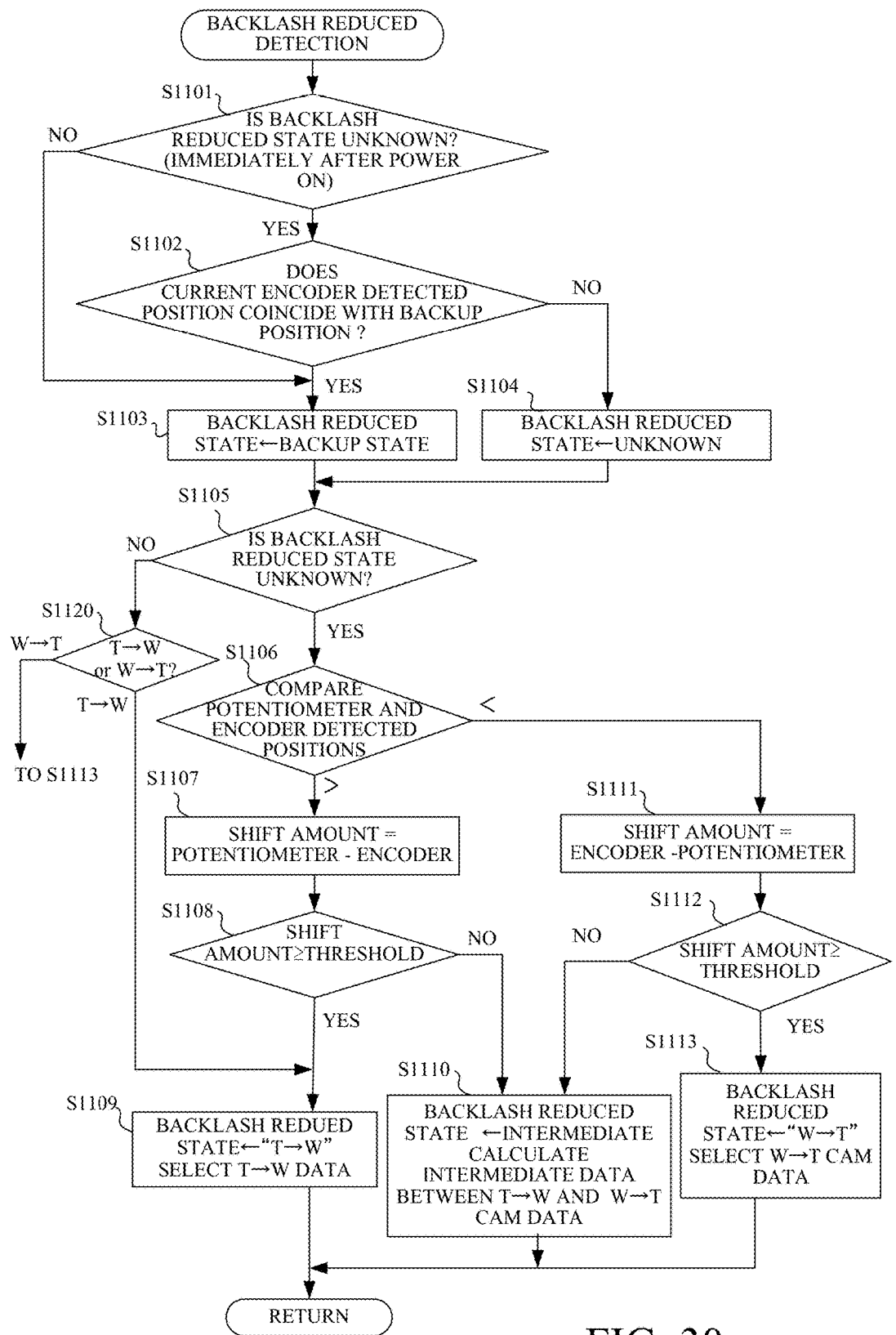
FIG. 30 illustrates a flowchart of a process for detecting a backlash reduction direction in Embodiment 6.

FIG. 30 illustrates a process for determining the backlash reduced state and selecting the cam data. The zoom tracking controller 215 as a computer performs this process according to a computer program. This process is performed, in response to power-on of the optical apparatus, immediately thereafter. The zoom tracking controller 215 causes the zoom position calculator 211, in response to a current power-on, to calculate the encoder detected position by using the detection signal from the encoder (optical sensor 807) and acquires the calculated encoder detected position as a current encoder detected position.

At step S1101, the zoom tracking controller 215 determines, immediately after the current power-on, whether or not the backlash reduced state is unknown. If the backlash reduced state is not unknown, the zoom tracking controller 215 proceeds to step S1103. If the backlash reduced state is unknown, the zoom tracking controller 215 proceeds to step S1102.

At step S1102, the zoom tracking controller 215 determines whether or not the current encoder detected position coincides with an encoder detected position stored at the previous power-off (stored detected position; hereinafter referred to as "a backup position"). If the current encoder detected position coincides with the backup position, that is, the backlash reduced state has not changed from the previous power-off, the zoom tracking controller 215 proceeds to step S1103.

At step S1103, the zoom tracking controller 215 sets a state where the backlash is reduced in a backup zoom direction (stored magnification-variation direction) stored as a zoom operation direction to the backup position at the previous power-off, to a current backlash reduced state. Then, the zoom tracking controller 215 proceeds to step S1105.

On the other hand, if the current encoder detected position does not coincide with the backup position, the zoom tracking controller 215 regards the backlash reduced state as having changed from the previous power-off to proceed to step S1104.

At step S1104, the zoom tracking controller 215 sets "unknown" to the current backlash reduced state and then proceeds to step S1105.

At step S1105, the zoom tracking controller 215 determines whether or not the current backlash reduced state is "unknown". If the current backlash reduced state is "unknown", the zoom tracking controller 215 proceeds to step S1106, and otherwise proceeds to step S1120.

At step S1120, the zoom tracking controller 215 determines whether or not the current backlash reduced state is a W-side backlash reduced state in which the backlash is reduced by the zoom operation for the zoom T→W or a T-side backlash reduced state in which the backlash is reduced by the zoom operation for the zoom W→T. If the current backlash reduced state is the W-side backlash reduced state (T→W), the zoom tracking controller 215 proceeds to step S1109. If the current backlash reduced state is the T-side backlash reduced state (W→T), the zoom tracking controller 215 proceeds to step S1113.

At step S1106, the zoom tracking controller 215 causes the zoom position calculator 211 to calculate the potentiometer detected position by using the detection signal from the potentiometer 808 and acquires the calculated potentiometer detected position as a current potentiometer detected position. Then, the zoom tracking controller 215 compares the current potentiometer detected position with the current encoder detected position.

If determining that the current potentiometer detected position is larger (on the telephoto side further) than the current encoder detected position, the zoom tracking controller 215 proceeds to step S1107 to calculate a difference (shift amount) of the current potentiometer detected position from the current encoder detected position.

Next, the zoom tracking controller 215 proceeds to step S1108 to set a threshold (second threshold) corresponding to a difference between the encoder detected position (2) illustrated in FIG. 29 by the line with circled 2 and the potentiometer detected position (4) illustrated in FIG. 29 by the line with circled 4. Then, the zoom tracking controller 215 determines whether or not the shift amount is equal to or larger than the threshold. If the shift amount is equal to or larger than the threshold, the zoom tracking controller 215 determines that the W-side backlash reduced state is obtained by the zoom operation for the zoom T→W after the previous power-off and before the current power-on and selects the T→W cam data at step S1109.

On the other hand, if the shift amount is smaller than the threshold at step S1108, the zoom tracking controller 215 regards the backlash as being not reduced on both the telephoto and wide-angle sides and determines at step S1100 that the backlash reduced state is an intermediate state. Then, the zoom tracking controller 215 calculates (produces) intermediate cam data (third data) by using the T→W cam data and the W→T cam data.

If determining at step S1106 that the current potentiometer detected position is smaller (on the wide-angle side further) than the current encoder detected position, the zoom tracking controller 215 proceeds to step S1111 to calculate a difference (shift amount) of the current encoder detected position from the current potentiometer detected position.

Next, the zoom tracking controller 215 proceeds to step S1102 to set a threshold (first threshold) corresponding to a difference between the encoder detected position (1) illustrated in FIG. 29 by the line with circled 1 and the potentiometer detected position (3) illustrated in FIG. 29 by the line with circled 3. Then, the zoom tracking controller 215 determines whether or not the shift amount is equal to or larger than the threshold. If the shift amount is equal to or larger than the threshold, the zoom tracking controller 215 determines that the T-side backlash reduced state is obtained by the zoom operation for the zoom W→T after the previous power-off and before the current power-on and selects the W→T cam data at step S1113.

On the other hand, if the shift amount is smaller than the threshold at step S1112, the zoom tracking controller 215 determines at step S1100 that the backlash reduced state is the intermediate state as described above. Then, the zoom tracking controller 215 calculates (produces) the intermediate cam data.

The zoom tracking controller 215 having thus selected one of the T→W cam data and the W→T cam data or having produced the intermediate cam data starts the zoom tracking control using the selected or produced cam data.

Figure 31:
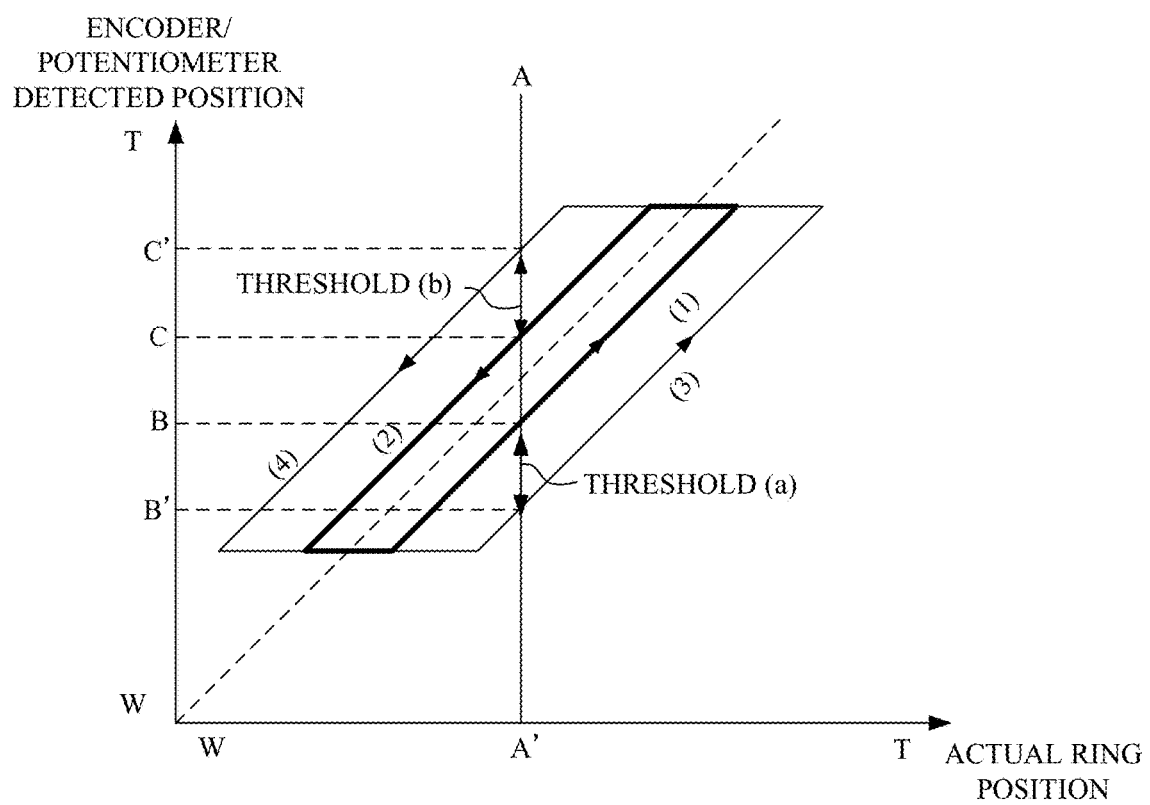
FIG. 31 illustrates a threshold setting process in Embodiment 6.

Description will be made of a method of setting the threshold at steps S1108 and S1112 with referring to FIG. 31. In FIG. 31, a dashed line and lines with circled 1 to 4 (hereinafter referred to respectively as "lines (1) to (4)") are the same as those illustrated in FIG. 29.

When the actual ring position reaches the position A-A' by the zoom operation for the zoom W→T, the encoder detected position and the potentiometer detected position are an encoder detected position B obtained from the line (1) and a potentiometer detected position B' obtained from the line (3). This embodiment calculates a difference "a" between the encoder detected position B and the potentiometer detected position B' and sets this difference a to the first threshold at step S1112.

On the other hand, when the actual ring position reaches the position A-A' by the zoom operation for the zoom T→W, the encoder detected position and the potentiometer detected position are an encoder detected position C obtained from the line (2) and a potentiometer detected position C' obtained from the line (4). This embodiment calculates a difference "b" between the encoder detected position C and the potentiometer detected position C' and sets this difference b to the second threshold at step S1108.

Another method may be employed which measures data of the encoder detected position corresponding to the lines (1) and (2) and data of the potentiometer detected position corresponding to the lines (3) and (4) and stores these data to the memory beforehand and calculates the first and second thresholds at each time of performing the process of FIG. 30. In addition, still another method may be employed which measures amounts of the above-described ring coupling backlash, potentiometer drive backlash and in-potentiometer backlash and calculates the first and second thresholds from the measured results.

As described above, this embodiment determines, by using the relation between the encoder detected position and the potentiometer detected position acquired at the power-on (or immediately after the power-on), whether the backlash reduced state obtained by the zoom operation performed before the power-on is the T-side or W-side backlash reduced state (backlash completely reduced state) or the intermediate state. Then, this embodiment selects or produces as the cam data used for the zoom tracking control, depending on the determination result, one of the T→W cam data, the W→T cam data and the intermediate cam data.

In other words, this embodiment enables confirming which magnification direction the mechanical backlash from the movable member to the magnification-varying lens has been reduced in by using the relation between the detected positions obtained from the two position detectors and enables selecting the data used for the zoom tracking control depending on the confirmation result. Accordingly, the embodiment enables performing a good zoom tracking control from immediately after the power-on even if the encoder cannot detect the zoom operation performed before the power-on.

Although this embodiment described the case of moving the focus lens as the focus element to reduce the image plane variation caused by the variation of magnification, an alternative embodiment of the present invention may use an image sensor as the focus element and move it in the optical axis direction to reduce the image plane variation caused by the variation of magnification.

Although this embodiment described the optical apparatus (such as a lens-integrated image capturing apparatus and an interchangeable lens) including the image capturing optical system 802 and the zoom tracking controller 215, an alternative embodiment of the present invention may be an optical apparatus (such as an lens-interchangeable image capturing apparatus) having no image capturing optical system 802 and including the zoom tracking controller 215. The optical apparatus only needs a focus element (such as a focus lens or an image sensor).

Although this embodiment described the case of producing the first position signal by using the multiple detection signals obtained from the optical sensor 807 and acquiring, from the first position signal, the absolute position signal indicating the rotation position of the drive ring 804 used for the position control of the focus lens 802-2, an alternative embodiment of the present invention may produce, by using the detection signal from the potentiometer 808, a second position signal having a resolution different from (lower than) that of the first position signal obtained by using the optical sensor 807 and combines the first and second position signals together to produce an absolute position signal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-041004, 2015-041075, 2015-041111 and 2015-040938 filed on Mar. 3, 2015 and 2015-071789 filed on Mar. 31, 2015, which are hereby incorporated by reference wherein in their entirety.

What is claimed is:

1. A position detection apparatus comprising:
a first position detector (a) being an optical position detector used with an optical scale provided with multiple periodic patterns whose periods are mutually different and (b) configured to receive lights from the multiple periodic patterns when moving relatively to the optical scale with a movement of a movable member to generate multiple first detection signals respectively changing at periods corresponding to the periods of the multiple periodic patterns;
a second position detector being a non-optical position detector and configured to generate a second detection signal changing with the movement of the moveable member; and
a calculator configured to (a) produce a first position signal by using the multiple first detection signals, (b) produce a second position signal whose resolution is different from that of the first position signal, by using the second detection signal, and (c) perform a calculation for combining the first position signal with the second position signal to produce a signal showing an absolute position of the movable member,
wherein the first position signal has multiple folded-back portions; and
the resolution of the second position signal is a resolution capable of specifying one of the multiple folded-back portions.

2. A position detection apparatus according to claim 1, wherein the second position signal has a lower solution than that of the first position signal.

3. A position detection apparatus according to claim 1, wherein the second position detector is a variable resistor whose electronic resistance value changes with the movement of the movable member.

4. A position detection apparatus according to claim 1, wherein the calculator is configured to (a) perform a process for normalizing an output range and a scale range of the second position signal respectively with respect to an output range and a scale range of the first position signal and (b) then perform calculation for combining the first position signal with the second position signal.

5. A position detection apparatus according to claim 4, wherein:
the multiple first detection signals re two phase signals whose phases are mutually different by 90°;
the output range of the first position signal is an angle range from 0° to 360° obtained by an arctangent conversion of the two phase signals; and
the calculator is configured to normalize the output range of the second position signal such that the normalized output range corresponds to the angle range from 0° to 360° of the first position signal.

6. A position d e ion apparatus according to claim 4, wherein the calculator is configured to normalize the scale range of the second position signal by an accumulated angle in the first position signal when the movable member is moved in its entire movable range.

7. A position detection apparatus according to claim 4, wherein the calculator calculates a difference between the position signal produced by the first position detector being the optical position detector and the second position signal produced by the second position detector being the non-optical position detector, the first and second position signals being normalized by the process for normalizing the output range and the scale range of the second position signal respectively with respect to the output range and the scale range of the first position signal.

8. A position detection apparatus according to claim 1, wherein:
the first position signal includes (a) signals $\theta 1$ and $\theta 1'$ obtained by an arctangent conversion of two signals changing at mutually different periods P1 and P1' and (b) signals θ2 and θ2' obtained by an arctangent conversion of two signals changing at mutually different periods P2 and P2' respectively shorter than the periods P1 and P1'; and the calculator is configured to:

perform a vernier calculation on the signals θ2 and θ2' to produce a middle level signal;

produce, from the signal θ1, a lower level signal;

produce, from the signal θ2, a lowest level signal; and perform a process for combining the second position signal as the upper level signal with the middle level signal, the lower level signal and the lowest level signal to produce the signal showing the absolute position.

9. A position detection apparatus according to claim 1, wherein the calculator calculates a correction gain that depends on a ratio of the first position signal and the second position signal and corrects the absolute position signal by using the corrections gain.

10. A position detection apparatus according to claim 9, wherein the optical kale is fixed to a member in which the optical scale is installed at a first position in a relative movement direction of the optical scale and the first position detector, the calculator calculates the correction gain that depends on a ratio of the first position and the second position signal which are obtained at a second position different from the first position in the relative movement direction.

11. A position detection apparatus according to claim 9, wherein the calculator calculates the correction gain again when a difference between the second position signal and the corrected absolute position signal is larger than a predetermined value.

12. A position detection apparatus according to claim 9, wherein the calculator calculates the correction gain at predetermined time intervals.

13. A position detection apparatus according to claim 9, further comprising a temperature sensor, wherein the calculator calculates the correction gain when a change amount of a detected temperature from the temperature sensor is larger than a predetermined change amount.

14. A position detection apparatus according to claim 1, wherein the calculator selects the absolute position signal as signal indicating a position of the movable member when a difference between the absolute position signal and the second position signal is smaller than or equal to a predetermined value, and selects the second position signal as a signal indicating a position of the movable member when the difference is larger than the predetermined value.

15. A position detection apparatus according to claim 14, wherein the predetermined value is set on a basis of a resolution of the second portion signal.

16. A position detection apparatus according to claim 1, wherein the calculator selects the absolute position signal as a signal indicating a position of the movable member when a noise component included in the first position signal is smaller than or equal to a predetermined value, and select the second position signal as a signal indicating a position of the movable member when the noise component is larger than the predetermined value.

17. An apparatus comprising:

a position detection apparatus, and a movable member whose absolute position is detected by the position detection apparatus, wherein the position detection apparatus comprises:

a first position detector (a) being an optical position detector used with an optical scale provided with multiple periodic patterns whose periods are mutually different and (b) configured receive lights from the multiple periodic patterns when moving relatively to the optical scale with a movement of the movable member to generate multiple first detection signals respectively changing at periods corresponding to the periods of the multiple periodic patterns;

a second position detector being a non-optical position detector and configured to generate a second detection signal changing with the movement of the movable member; and a calculator configured to (a) produce a first position signal by using the multiple first detection signals, (b) produce a second position signal whose resolution is different from that of the first position signal, by using the second detection signal, and (c) perform calculation for combining the first position signal with the second position signal to produce a signal showing an absolute position of the movable member, wherein the first position signal has multiple folded-back portions; and the resolution of the second position signal is a resolution capable of specifying one of the multiple folded-back portions.

18. A position detection method using:

a first position detector (a) being an optical position detector used with an optical scale provided with multiple periodic patterns whose periods are mutually different and (b) configured to receive lights from the multiple periodic patterns when moving relatively to the optical scale with a movement of a movable member to generate multiple first detection signals respectively changing at periods corresponding to the periods of the multiple periodic patterns; and a second position detector being a non-optical position detector and configured to generate a second detection signal changing with the movement of the movable member, the method comprising:

producing a first position signal by wising the multiple first detection signals;

producing a second position signal whose resolution is different from that of the first position signal, by using the second detection signal; and performing a calculation for combining the first position signal with the second position signal to produce a signal showing an absolute position of the movable member, wherein the first position signal has multiple folded-back portions, and the resolution of the second position signal is a resolution capable of specifying one of the multiple folded-back portions.

* * * * *